US010033700B2

(12) United States Patent
Ouye et al.

(10) Patent No.: US 10,033,700 B2
(45) Date of Patent: Jul. 24, 2018

(54) DYNAMIC EVALUATION OF ACCESS RIGHTS

(75) Inventors: Michael Michio Ouye, Portola Valley, CA (US); Steven Toye Crocker, Redwood City, CA (US)

(73) Assignee: INTELLECTUAL VENTURES I LLC, Wilmington, DE (US)

( * ) Notice: Subject to any disclaimer, the term of this patent is extended or adjusted under 35 U.S.C. 154(b) by 1023 days.

(21) Appl. No.: 10/127,109

(22) Filed: Apr. 22, 2002

(65) Prior Publication Data

US 2003/0120601 A1   Jun. 26, 2003

Related U.S. Application Data

(63) Continuation-in-part of application No. 10/076,254, filed on Feb. 12, 2002, now Pat. No. 7,260,555.

(Continued)

(51) Int. Cl.
G06F 21/00 (2013.01)
H04L 29/06 (2006.01)
G06F 21/62 (2013.01)

(52) U.S. Cl.
CPC .......... *H04L 63/04* (2013.01); *G06F 21/6209* (2013.01); *G06F 21/6227* (2013.01); *H04L 63/08* (2013.01); *H04L 63/105* (2013.01); *H04L 63/12* (2013.01); *H04L 67/42* (2013.01); *G06F 2221/2107* (2013.01);
(Continued)

(58) Field of Classification Search
None
See application file for complete search history.

(56) References Cited

U.S. PATENT DOCUMENTS 4,203,166 A    5/1980   Eshram et al.
4,238,854 A   12/1980   Ehrsam et al.
(Continued)

FOREIGN PATENT DOCUMENTS

EP    0 629 953 A1   12/1994
EP    0 672 991 A2    9/1995
(Continued)

OTHER PUBLICATIONS

Donald et al. (2001). MCSE: Windows® 2000 Professional Study Guide Second Edition. Retrieved online Jan. 31, 2018. http://142.177.80.139/darlene_redmond/MCP/70-210%20MCSE%20Windows%202000%20Professional%20Study%20Guide%202nd%20ed%20Sybex.pdf.*
(Continued)

*Primary Examiner* — James A Reagan
(74) *Attorney, Agent, or Firm* — Sterne, Kessler, Goldstein & Fox P.L.L.C.

(57) ABSTRACT

To grant or deny access rights to a user attempting to access a protected system or secured electronic data, an access right evaluation process is carried out among all applicable policies including those embedded in the secured electronic data. In a preferred embodiment, the access right evaluation process is invoked only when a system being accessed is protected or a file being accessed is detected to be in a secured format. Further, the access right evaluation process is configured preferably to operate transparently to the user. The access right evaluation may be advantageously used in systems or applications in which devices, mediums or electronic data are secured and can be restrictively accessed by those who are authenticated and have proper access privilege.

27 Claims, 8 Drawing Sheets

Related U.S. Application Data

(60) Provisional application No. 60/339,634, filed on Dec. 12, 2001.

(52) U.S. Cl.
CPC ........... *G06F 2221/2111* (2013.01); *G06F 2221/2113* (2013.01); *G06F 2221/2137* (2013.01); *G06F 2221/2141* (2013.01); *H04L 63/101* (2013.01); *H04L 63/102* (2013.01)

(56) References Cited

U.S. PATENT DOCUMENTS

| | | |
|---|---|---|
| 4,423,287 A | 12/1983 | Zeidler |
| 4,423,387 A | 12/1983 | Sempel |
| 4,734,568 A | 3/1988 | Watanabe |
| 4,757,533 A | 7/1988 | Allen et al. |
| 4,796,220 A | 1/1989 | Wolfe |
| 4,799,258 A | 1/1989 | Davies |
| 4,827,508 A | 5/1989 | Shear |
| 4,887,204 A | 12/1989 | Johnson et al. |
| 4,888,800 A | 12/1989 | Marshall et al. |
| 4,912,552 A | 3/1990 | Allison et al. |
| 4,972,472 A | 11/1990 | Brown et al. |
| 5,032,979 A | 7/1991 | Hecht et al. |
| 5,052,040 A | 9/1991 | Preston et al. |
| 5,058,164 A | 10/1991 | Elmer et al. |
| 5,144,660 A | 9/1992 | Rose |
| 5,204,897 A | 4/1993 | Wyman |
| 5,212,788 A | 5/1993 | Lomet et al. |
| 5,220,657 A | 6/1993 | Bly et al. |
| 5,235,641 A | 8/1993 | Nozawa et al. |
| 5,247,575 A | 9/1993 | Sprague et al. |
| 5,267,313 A | 11/1993 | Hirata |
| 5,276,735 A | 1/1994 | Boebert et al. |
| 5,301,247 A | 4/1994 | Rasmussen et al. |
| 5,319,705 A | 6/1994 | Halter et al. |
| 5,369,702 A | 11/1994 | Shanton |
| 5,375,169 A | 12/1994 | Seheidt et al. |
| 5,404,404 A | 4/1995 | Novorita |
| 5,406,628 A | 4/1995 | Beller et al. |
| 5,414,852 A | 5/1995 | Kramer et al. |
| 5,434,918 A | 7/1995 | Kung et al. |
| 5,461,710 A | 10/1995 | Bloomfield et al. |
| 5,467,342 A | 11/1995 | Logston et al. |
| 5,495,533 A | 2/1996 | Linehan et al. |
| 5,497,422 A | 3/1996 | Tysen et al. |
| 5,499,297 A | 3/1996 | Boebert |
| 5,502,766 A | 3/1996 | Boebert et al. |
| 5,535,375 A | 7/1996 | Eshel et al. |
| 5,557,765 A | 9/1996 | Lipner et al. |
| 5,570,108 A | 10/1996 | McLaughlin et al. |
| 5,584,023 A | 12/1996 | Hsu |
| 5,600,722 A | 2/1997 | Yamaguchi et al. |
| 5,606,663 A | 2/1997 | Kadooka |
| 5,619,576 A | 4/1997 | Shaw |
| 5,638,501 A | 6/1997 | Gough et al. |
| 5,640,388 A | 6/1997 | Woodhead et al. |
| 5,655,119 A | 8/1997 | Davy |
| 5,661,668 A | 8/1997 | Yemini et al. |
| 5,661,806 A | 8/1997 | Nevoux et al. |
| 5,671,412 A | 9/1997 | Christiano |
| 5,673,316 A | 9/1997 | Auerbach et al. |
| 5,677,953 A | 10/1997 | Dolphin |
| 5,680,452 A | 10/1997 | Shanton |
| 5,682,537 A | 10/1997 | Davies et al. |
| 5,684,987 A | 11/1997 | Mamiya et al. |
| 5,689,688 A | 11/1997 | Strong et al. |
| 5,689,718 A | 11/1997 | Sakurai et al. |
| 5,693,652 A | 12/1997 | Barrus et al. |
| 5,699,428 A | 12/1997 | McDonnal et al. |
| 5,708,709 A | 1/1998 | Rose |
| 5,715,314 A | 2/1998 | Payne et al. |
| 5,715,403 A | 2/1998 | Stefik |
| 5,717,755 A | 2/1998 | Shanton |
| 5,719,941 A | 2/1998 | Swift et al. |
| 5,720,033 A | 2/1998 | Deo |
| 5,729,734 A | 3/1998 | Parker et al. |
| 5,732,265 A | 3/1998 | Dewitt et al. |
| 5,745,573 A | 4/1998 | Lipner et al. |
| 5,745,750 A | 4/1998 | Porcaro |
| 5,748,736 A | 5/1998 | Mittra |
| 5,751,287 A | 5/1998 | Hahn et al. |
| 5,757,920 A | 5/1998 | Misra et al. |
| 5,765,152 A | 6/1998 | Ericson |
| 5,768,381 A | 6/1998 | Hawthorne |
| 5,778,065 A | 7/1998 | Hauser et al. |
| 5,778,350 A | 7/1998 | Adams et al. |
| 5,781,711 A | 7/1998 | Austin et al. |
| 5,787,169 A | 7/1998 | Eldridge et al. |
| 5,787,173 A | 7/1998 | Seheidt et al. |
| 5,787,175 A | 7/1998 | Carter |
| 5,790,789 A | 8/1998 | Suarez |
| 5,790,790 A | 8/1998 | Smith et al. |
| 5,796,825 A | 8/1998 | McDonnal et al. |
| 5,813,009 A | 9/1998 | Johnson et al. |
| 5,821,933 A | 10/1998 | Keller et al. |
| 5,825,876 A | 10/1998 | Peterson |
| 5,832,518 A | 11/1998 | Mastors |
| 5,835,592 A | 11/1998 | Chang et al. |
| 5,835,601 A | 11/1998 | Shimbo et al. |
| 5,850,443 A | 12/1998 | Van Oorschot et al. |
| 5,857,189 A | 1/1999 | Riddle |
| 5,862,325 A | 1/1999 | Reed et al. |
| 5,870,468 A | 2/1999 | Harrison |
| 5,870,477 A | 2/1999 | Sasaki et al. |
| 5,881,287 A | 3/1999 | Mast |
| 5,884,031 A | 3/1999 | Ice |
| 5,892,900 A | 4/1999 | Ginter et al. |
| 5,893,084 A | 4/1999 | Morgan et al. |
| 5,898,781 A | 4/1999 | Shanton |
| 5,922,073 A | 7/1999 | Shimada |
| 5,923,754 A | 7/1999 | Angelo et al. |
| 5,933,498 A * | 8/1999 | Schneck ............ G06F 21/10 705/54 |
| 5,944,794 A | 8/1999 | Okamoto et al. |
| 5,953,419 A | 9/1999 | Lohstroh et al. |
| 5,968,177 A | 10/1999 | Batten-Carew et al. |
| 5,970,502 A | 10/1999 | Salkewicz et al. |
| 5,978,802 A | 11/1999 | Hurvig |
| 5,987,440 A | 11/1999 | O'Neil et al. |
| 5,991,402 A | 11/1999 | Jia et al. |
| 5,991,879 A | 11/1999 | Still |
| 5,999,907 A | 12/1999 | Donner |
| 6,011,847 A | 1/2000 | Follendore, III |
| 6,012,044 A | 1/2000 | Maggioncalda et al. |
| 6,014,730 A | 1/2000 | Ohtsu |
| 6,023,506 A | 2/2000 | Ote et al. |
| 6,031,584 A | 2/2000 | Gray |
| 6,032,216 A | 2/2000 | Schmuck et al. |
| 6,035,404 A | 3/2000 | Zhao |
| 6,038,322 A | 3/2000 | Harkins |
| 6,044,155 A | 3/2000 | Thomlinson et al. |
| 6,055,314 A | 4/2000 | Spies et al. |
| 6,058,424 A | 5/2000 | Dixon et al. |
| 6,061,790 A | 5/2000 | Bodnar |
| 6,061,797 A | 5/2000 | Jade et al. |
| 6,069,057 A | 5/2000 | Wu |
| 6,070,244 A | 5/2000 | Orchier et al. |
| 6,081,840 A | 6/2000 | Zhao |
| 6,085,323 A | 7/2000 | Shimizu et al. |
| 6,088,717 A | 7/2000 | Reed et al. |
| 6,088,805 A | 7/2000 | Davis et al. |
| 6,098,056 A | 8/2000 | Rusnak et al. |
| 6,101,507 A | 8/2000 | Cane et al. |
| 6,105,131 A | 8/2000 | Carroll |
| 6,122,630 A | 8/2000 | Strickler et al. |
| 6,134,327 A | 10/2000 | Van Oorschot |
| 6,134,658 A | 10/2000 | Multerer et al. |
| 6,134,660 A | 10/2000 | Boneh et al. |
| 6,134,664 A | 10/2000 | Walker |
| 6,141,754 A | 10/2000 | Choy |
| 6,145,084 A | 11/2000 | Zuili |
| 6,148,338 A | 11/2000 | Lachelt et al. |

(56) References Cited

U.S. PATENT DOCUMENTS

| | | |
|---|---|---|
| 6,158,010 A | 12/2000 | Moriconi et al. |
| 6,161,139 A | 12/2000 | Win et al. |
| 6,167,358 A | 12/2000 | Othmer et al. |
| 6,170,060 B1 | 1/2001 | Mott et al. |
| 6,182,142 B1 | 1/2001 | Win et al. |
| 6,185,612 B1 | 2/2001 | Jensen et al. |
| 6,185,684 B1 | 2/2001 | Pravetz et al. |
| 6,192,408 B1 | 2/2001 | Vahalia et al. |
| 6,199,070 B1 | 3/2001 | Polo-Wood et al. |
| 6,205,549 B1 | 3/2001 | Pravetz et al. |
| 6,212,561 B1 | 4/2001 | Sitaraman et al. |
| 6,223,285 B1 | 4/2001 | Komuro et al. |
| 6,226,618 B1 | 5/2001 | Downs et al. |
| 6,226,745 B1 | 5/2001 | Wiederhold |
| 6,240,188 B1 | 5/2001 | Dondeti et al. |
| 6,249,755 B1 | 6/2001 | Yemini et al. |
| 6,249,873 B1 | 6/2001 | Richard et al. |
| 6,253,193 B1 | 6/2001 | Ginter et al. |
| 6,260,040 B1 | 7/2001 | Kauffman et al. |
| 6,260,141 B1 | 7/2001 | Park |
| 6,263,348 B1 | 7/2001 | Kathrow et al. |
| 6,266,420 B1 | 7/2001 | Langford et al. |
| 6,272,631 B1 | 8/2001 | Thomlinson et al. |
| 6,272,632 B1 | 8/2001 | Carman et al. |
| 6,282,649 B1 | 8/2001 | Lambert et al. |
| 6,289,450 B1 | 9/2001 | Pensak et al. |
| 6,289,458 B1 | 9/2001 | Garg et al. |
| 6,292,895 B1 | 9/2001 | Baltzley |
| 6,292,899 B1 | 9/2001 | McBride |
| 6,295,361 B1 | 9/2001 | Kadansky et al. |
| 6,299,069 B1 | 10/2001 | Shona |
| 6,301,614 B1 | 10/2001 | Najork et al. |
| 6,308,256 B1 | 10/2001 | Folmsbee |
| 6,308,273 B1 | 10/2001 | Goertzel et al. |
| 6,314,408 B1 | 11/2001 | Salas et al. |
| 6,314,409 B2 | 11/2001 | Schneck et al. |
| 6,317,777 B1 | 11/2001 | Skarbo et al. |
| 6,332,025 B2 | 12/2001 | Takahashi et al. |
| 6,336,114 B1 | 1/2002 | Garrison |
| 6,339,423 B1 | 1/2002 | Sampson et al. |
| 6,339,825 B2 | 1/2002 | Pensak et al. |
| 6,341,164 B1 | 1/2002 | Dilkie et al. |
| 6,343,316 B1 | 1/2002 | Sakata |
| 6,347,374 B1 | 2/2002 | Drake et al. |
| 6,349,337 B1 | 2/2002 | Parsons et al. |
| 6,351,813 B1 | 2/2002 | Mooney et al. |
| 6,353,859 B1 | 3/2002 | McKeehan et al. |
| 6,356,903 B1 | 3/2002 | Baxter et al. |
| 6,356,941 B1 | 3/2002 | Cohen |
| 6,357,010 B1 | 3/2002 | Viets et al. |
| 6,363,480 B1 | 3/2002 | Perlman |
| 6,366,298 B1 | 4/2002 | Haitsuka et al. |
| 6,370,249 B1 | 4/2002 | Van Oorschot |
| 6,381,698 B1 | 4/2002 | Devanbu et al. |
| 6,385,644 B1 | 5/2002 | Devine et al. |
| 6,389,433 B1 | 5/2002 | Bolosky et al. |
| 6,389,538 B1 | 5/2002 | Gruse et al. |
| 6,393,420 B1 | 5/2002 | Peters |
| 6,405,315 B1 | 6/2002 | Burns et al. |
| 6,405,318 B1 | 6/2002 | Rowland |
| 6,408,404 B1 | 6/2002 | Ladwig |
| 6,421,714 B1 | 7/2002 | Rai et al. |
| 6,442,688 B1 | 8/2002 | Moses et al. |
| 6,442,695 B1 | 8/2002 | Dutcher et al. |
| 6,446,090 B1 | 9/2002 | Hart |
| 6,449,721 B1 | 9/2002 | Pensak et al. |
| 6,453,353 B1 | 9/2002 | Win et al. |
| 6,453,419 B1 | 9/2002 | Flint et al. |
| 6,466,476 B1 | 10/2002 | Wong et al. |
| 6,466,932 B1 | 10/2002 | Dennis et al. |
| 6,477,544 B1 | 11/2002 | Bolosky et al. |
| 6,487,662 B1 | 11/2002 | Kharon et al. |
| 6,490,680 B1 | 12/2002 | Scheidt et al. |
| 6,505,300 B2 | 1/2003 | Chan et al. |
| 6,510,349 B1 | 1/2003 | Schneck et al. |
| 6,519,700 B1 | 2/2003 | Ram et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |
| 6,549,623 B1 | 4/2003 | Scheidt et al. |
| 6,550,011 B1 | 4/2003 | Sims |
| 6,557,039 B1 | 4/2003 | Leong et al. |
| 6,567,914 B1 | 5/2003 | Just et al. |
| 6,571,291 B1 * | 5/2003 | Chow ........................ 709/230 |
| 6,574,733 B1 | 6/2003 | Langford |
| 6,584,466 B1 | 6/2003 | Serbinis et al. |
| 6,587,878 B1 | 7/2003 | Merriam |
| 6,587,946 B1 | 7/2003 | Jakobsson |
| 6,588,673 B1 | 7/2003 | Chan et al. |
| 6,591,295 B1 | 7/2003 | Diamond et al. |
| 6,594,662 B1 | 7/2003 | Sieffert et al. |
| 6,598,161 B1 | 7/2003 | Kluttz et al. |
| 6,601,170 B1 | 7/2003 | Wallace, Jr. |
| 6,603,857 B1 | 8/2003 | Batten-Carew et al. |
| 6,608,636 B1 | 8/2003 | Roseman |
| 6,609,115 B1 | 8/2003 | Mehring et al. |
| 6,611,599 B2 | 8/2003 | Natarajan |
| 6,611,846 B1 | 8/2003 | Stoodley |
| 6,615,349 B1 | 9/2003 | Hair |
| 6,615,350 B1 | 9/2003 | Schell et al. |
| 6,625,650 B2 * | 9/2003 | Stelliga ........................ 709/226 |
| 6,625,734 B1 | 9/2003 | Marvit et al. |
| 6,629,140 B1 | 9/2003 | Fertell et al. |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 | 11/2003 | Numao et al. |
| 6,678,835 B1 | 1/2004 | Shah et al. |
| 6,683,954 B1 | 1/2004 | Searle |
| 6,687,822 B1 | 2/2004 | Jakobsson |
| 6,693,652 B1 | 2/2004 | Barrus et al. |
| 6,698,022 B1 | 2/2004 | Wu |
| 6,711,683 B1 | 3/2004 | Laczko et al. |
| 6,718,361 B1 | 4/2004 | Basani et al. |
| 6,735,701 B1 | 5/2004 | Jacobson |
| 6,738,908 B1 | 5/2004 | Bonn et al. |
| 6,751,573 B1 | 6/2004 | Burch |
| 6,754,657 B2 | 6/2004 | Lomet |
| 6,754,665 B1 | 6/2004 | Futagami et al. |
| 6,775,779 B1 | 8/2004 | England et al. |
| 6,779,031 B1 | 8/2004 | Picher-Dempsey |
| 6,782,403 B1 | 8/2004 | Kino et al. |
| 6,801,999 B1 | 10/2004 | Vankatesan et al. |
| 6,807,534 B1 | 10/2004 | Erickson |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,816,969 B2 | 11/2004 | Miyazaki et al. |
| 6,826,698 B1 | 11/2004 | Minkin et al. |
| 6,834,333 B2 | 12/2004 | Yoshino et al. |
| 6,834,341 B1 | 12/2004 | Bahl et al. |
| 6,842,825 B2 | 1/2005 | Geiner et al. |
| 6,845,452 B1 | 1/2005 | Roddy et al. |
| 6,851,050 B2 | 2/2005 | Singhal et al. |
| 6,862,103 B1 | 3/2005 | Miura et al. |
| 6,865,555 B2 | 3/2005 | Novak |
| 6,870,920 B2 | 3/2005 | Henits |
| 6,874,139 B2 | 3/2005 | Krueger et al. |
| 6,877,010 B2 | 4/2005 | Smith-Semedo et al. |
| 6,877,136 B2 | 4/2005 | Bess et al. |
| 6,882,994 B2 | 4/2005 | Yoshimura et al. |
| 6,961,855 B1 | 4/2005 | Rich et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,898,627 B1 | 5/2005 | Sekiguchi |
| 6,907,034 B1 | 6/2005 | Begis |
| 6,909,708 B1 | 6/2005 | Krishnaswamy et al. |
| 6,915,425 B2 | 7/2005 | Xu et al. |
| 6,915,434 B1 | 7/2005 | Kuroda et al. |

(56) References Cited

U.S. PATENT DOCUMENTS

| | | |
|---|---|---|
| 6,915,435 B1 | 7/2005 | Merriam |
| 6,920,558 B2 | 7/2005 | Sames et al. |
| 6,922,785 B1 | 7/2005 | Brewer et al. |
| 6,924,425 B2 | 8/2005 | Naples et al. |
| 6,931,450 B2 | 8/2005 | Howard et al. |
| 6,931,530 B2 | 8/2005 | Pham et al. |
| 6,931,597 B1 | 8/2005 | Prakash |
| 6,938,042 B2 | 8/2005 | Aboulhosn et al. |
| 6,938,156 B2 | 8/2005 | Wheeler et al. |
| 6,941,355 B1 | 9/2005 | Donaghey et al. |
| 6,941,456 B2 | 9/2005 | Wilson |
| 6,941,472 B2 | 9/2005 | Moriconi et al. |
| 6,944,183 B1 | 9/2005 | Iyer et al. |
| 6,947,556 B1 | 9/2005 | Matyas, Jr. et al. |
| 6,950,818 B2 | 9/2005 | Dennis et al. |
| 6,950,936 B2 | 9/2005 | Subramaniam et al. |
| 6,950,941 B1 | 9/2005 | Lee et al. |
| 6,950,943 B1 | 9/2005 | Bacha et al. |
| 6,952,215 B1 | 10/2005 | Devins et al. |
| 6,952,780 B2 | 10/2005 | Olsen et al. |
| 6,954,753 B1 | 10/2005 | Jeran et al. |
| 6,957,261 B2 | 10/2005 | Lortz |
| 6,959,308 B2 | 10/2005 | Gramsamer et al. |
| 6,961,849 B1 | 11/2005 | Davis et al. |
| 6,968,060 B1 | 11/2005 | Pinkas |
| 6,968,456 B1 | 11/2005 | Tripathi et al. |
| 6,971,018 B1 | 11/2005 | Witt et al. |
| 6,976,259 B1 | 12/2005 | Dutta et al. |
| 6,978,366 B1 | 12/2005 | Ignatchenko et al. |
| 6,978,376 B2 | 12/2005 | Giroux et al. |
| 6,978,377 B1 | 12/2005 | Asano et al. |
| 6,987,752 B1 | 1/2006 | Falco et al. |
| 6,988,133 B1 | 1/2006 | Zavalkovsky et al. |
| 6,988,199 B2 | 1/2006 | Toh et al. |
| 6,990,441 B1 | 1/2006 | Bolme et al. |
| 6,993,135 B2 | 1/2006 | Ishibashi |
| 6,996,718 B1 | 2/2006 | Henry et al. |
| 7,000,150 B1 | 2/2006 | Zunino et al. |
| 7,003,116 B2 | 2/2006 | Riedel et al. |
| 7,003,117 B2 | 2/2006 | Kacker et al. |
| 7,003,560 B1 | 2/2006 | Mullen et al. |
| 7,003,661 B2 | 2/2006 | Beattie et al. |
| 7,010,689 B1 | 3/2006 | Matyas et al. |
| 7,010,809 B2 | 3/2006 | Hori et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,043,637 B2 | 5/2006 | Bolosky et al. |
| 7,046,807 B2 | 5/2006 | Hirano et al. |
| 7,047,404 B1 | 5/2006 | Doonan et al. |
| 7,051,213 B1 | 5/2006 | Kobayashi et al. |
| 7,058,696 B1 | 6/2006 | Phillips et al. |
| 7,058,978 B2 | 6/2006 | Feuerstein et al. |
| 7,062,642 B1 | 6/2006 | Langrind et al. |
| 7,073,063 B2 | 7/2006 | Peinado |
| 7,073,073 B1 | 7/2006 | Nonaka et al. |
| 7,076,063 B2 | 7/2006 | Kuroiwa |
| 7,076,067 B2 | 7/2006 | Raike et al. |
| 7,076,312 B2 | 7/2006 | Law et al. |
| 7,076,469 B2 | 7/2006 | Schreiber et al. |
| 7,076,633 B2 | 7/2006 | Tormasov et al. |
| 7,080,077 B2 | 7/2006 | Ramamurthy et al. |
| 7,095,853 B2 | 8/2006 | Takuya |
| 7,096,266 B2 | 8/2006 | Lewin et al. |
| 7,099,926 B1 | 8/2006 | Ims et al. |
| 7,103,911 B2 | 9/2006 | Spies et al. |
| 7,107,185 B1 | 9/2006 | Yemini et al. |
| 7,107,269 B2 | 9/2006 | Arlein et al. |
| 7,107,416 B2 | 9/2006 | Stuart et al. |
| 7,113,594 B2 | 9/2006 | Boneh et al. |
| 7,116,785 B2 | 10/2006 | Okaue |
| 7,117,322 B2 | 10/2006 | Hochberg et al. |
| 7,120,635 B2 | 10/2006 | Bhide et al. |
| 7,120,757 B2 | 10/2006 | Tsuge |
| 7,124,164 B1 | 10/2006 | Chemtob |
| 7,126,957 B1 | 10/2006 | Isukapalli et al. |
| 7,130,964 B2 | 10/2006 | Ims et al. |
| 7,131,071 B2 | 10/2006 | Gune et al. |
| 7,134,041 B2 | 11/2006 | Murray et al. |
| 7,136,903 B1 | 11/2006 | Phillips et al. |
| 7,139,399 B1 | 11/2006 | Zimmermann |
| 7,140,044 B2 | 11/2006 | Redlich et al. |
| 7,145,898 B1 | 12/2006 | Elliott |
| 7,146,388 B2 | 12/2006 | Stakutis et al. |
| 7,146,498 B1 | 12/2006 | Takechi et al. |
| 7,159,036 B2 | 1/2007 | Hinchliffe et al. |
| 7,165,179 B2 | 1/2007 | Maruyama |
| 7,168,094 B1 | 1/2007 | Fredell |
| 7,171,557 B2 | 1/2007 | Kallahalla et al. |
| 7,174,563 B1 | 2/2007 | Brownlie et al. |
| 7,177,427 B1 | 2/2007 | Komuro et al. |
| 7,177,436 B2 | 2/2007 | Dube |
| 7,177,839 B1 | 2/2007 | Claxton et al. |
| 7,178,033 B1 | 2/2007 | Garcia |
| 7,181,017 B1 | 2/2007 | Nagel et al. |
| 7,185,196 B1 | 2/2007 | Kuskin et al. |
| 7,185,364 B2 | 2/2007 | Knouse et al. |
| 7,187,033 B2 | 3/2007 | Pendharkar |
| 7,188,181 B1 | 3/2007 | Squier et al. |
| 7,194,764 B2 | 3/2007 | Martherus et al. |
| 7,197,638 B1 | 3/2007 | Grawrock et al. |
| 7,200,747 B2 | 4/2007 | Riedel et al. |
| 7,203,317 B2 | 4/2007 | Kallahalla et al. |
| 7,203,968 B2 | 4/2007 | Asano et al. |
| 7,219,230 B2 | 5/2007 | Riedel et al. |
| 7,224,795 B2 | 5/2007 | Takada et al. |
| 7,225,256 B2 | 5/2007 | Villavicencio |
| 7,227,953 B2 | 6/2007 | Shida |
| 7,233,948 B1 | 6/2007 | Shamoon et al. |
| 7,237,002 B1 | 6/2007 | Estrada et al. |
| 7,249,044 B2 | 7/2007 | Kumar et al. |
| 7,249,251 B2 | 7/2007 | Todd et al. |
| 7,260,555 B2 | 8/2007 | Rossmann et al. |
| 7,265,764 B2 | 9/2007 | Alben et al. |
| 7,266,684 B2 | 9/2007 | Jancula |
| 7,280,658 B2 | 10/2007 | Amini et al. |
| 7,281,272 B1 | 10/2007 | Rubin et al. |
| 7,287,055 B2 | 10/2007 | Smith et al. |
| 7,287,058 B2 | 10/2007 | Loveland et al. |
| 7,290,148 B2 | 10/2007 | Tozawa et al. |
| 7,308,702 B1 | 12/2007 | Thomsen et al. |
| 7,313,824 B1 | 12/2007 | Bala et al. |
| 7,319,752 B2 | 1/2008 | Asano et al. |
| 7,340,600 B1 | 3/2008 | Corella |
| 7,343,488 B2 | 3/2008 | Yadav |
| 7,353,400 B1 | 4/2008 | Folmsbee |
| 7,359,517 B1 | 4/2008 | Rowe |
| 7,362,868 B2 | 4/2008 | Madoukh et al. |
| 7,380,120 B1 | 5/2008 | Garcia |
| 7,383,586 B2 | 6/2008 | Cross et al. |
| 7,386,529 B2 | 6/2008 | Kiessig et al. |
| 7,386,599 B1 | 6/2008 | Piersol et al. |
| 7,401,220 B2 | 7/2008 | Bolosky et al. |
| 7,406,596 B2 | 7/2008 | Tararukhina et al. |
| 7,415,608 B2 | 8/2008 | Bolosky et al. |
| 7,434,048 B1 | 10/2008 | Shapiro et al. |
| 7,454,612 B2 | 11/2008 | Bolosky et al. |
| 7,461,157 B2 | 12/2008 | Ahlard et al. |
| 7,461,405 B2 | 12/2008 | Boudreault et al. |
| 7,478,243 B2 | 1/2009 | Bolosky et al. |
| 7,478,418 B2 | 1/2009 | Supramaniam et al. |
| 7,484,245 B1 | 1/2009 | Friedman et al. |
| 7,496,959 B2 | 2/2009 | Adelstein et al. |
| 7,509,492 B2 | 3/2009 | Boyen et al. |
| 7,512,810 B1 | 3/2009 | Ryan |
| 7,526,657 B2 | 4/2009 | Saneto et al. |
| 7,539,867 B2 | 5/2009 | Bolosky et al. |
| 7,555,558 B1 | 6/2009 | Kenrich et al. |
| 7,562,232 B2 | 7/2009 | Zuili et al. |
| 7,565,683 B1 | 7/2009 | Huang et al. |
| 7,631,184 B2 | 12/2009 | Ryan |

(56) References Cited

U.S. PATENT DOCUMENTS

| | | |
|---|---|---|
| 7,634,433 B1 | 12/2009 | Drummond et al. |
| 7,681,034 B1 | 3/2010 | Lee et al. |
| 7,698,230 B1 | 4/2010 | Brown et al. |
| 7,702,909 B2 | 4/2010 | Vainstein |
| 7,703,140 B2 | 4/2010 | Nath et al. |
| 7,707,427 B1 | 4/2010 | Kenrich et al. |
| 7,729,995 B1 | 6/2010 | Zheng et al. |
| 7,730,543 B1 | 6/2010 | Nath et al. |
| 7,748,045 B2 | 6/2010 | Kenrich et al. |
| RE41,546 E | 8/2010 | Vainstein |
| 7,917,938 B2 | 3/2011 | Jacobson |
| 8,266,674 B2 | 9/2012 | Huang et al. |
| 8,327,138 B2 | 12/2012 | Nath et al. |
| 8,341,406 B2 | 12/2012 | Hildebrand |
| 8,341,407 B2 | 12/2012 | Kinghorn et al. |
| RE43,906 E | 1/2013 | Garcia |
| 8,543,827 B2 | 9/2013 | Garcia et al. |
| 8,918,839 B2 | 12/2014 | Vainstein et al. |
| 9,129,120 B2 | 9/2015 | Garcia et al. |
| 9,542,560 B2 | 1/2017 | Garcia et al. |
| 2001/0000265 A1 | 4/2001 | Schreiber et al. |
| 2001/0011254 A1 | 8/2001 | Clark |
| 2001/0014882 A1* | 8/2001 | Stefik ............... G06F 21/10 705/51 |
| 2001/0018743 A1 | 8/2001 | Takuya |
| 2001/0021255 A1 | 9/2001 | Ishibashi |
| 2001/0021926 A1 | 9/2001 | Schneck et al. |
| 2001/0023421 A1 | 9/2001 | Numao et al. |
| 2001/0032181 A1 | 10/2001 | Jakstadt et al. |
| 2001/0033611 A1 | 10/2001 | Grimwood et al. |
| 2001/0034839 A1 | 10/2001 | Karjoth et al. |
| 2001/0042110 A1 | 11/2001 | Furusawa et al. |
| 2001/0044903 A1 | 11/2001 | Yamamoto et al. |
| 2001/0056541 A1 | 12/2001 | Matsuzaki et al. |
| 2001/0056550 A1 | 12/2001 | Lee |
| 2002/0003886 A1 | 1/2002 | Hillegass et al. |
| 2002/0007335 A1 | 1/2002 | Millard et al. |
| 2002/0010679 A1* | 1/2002 | Felsher ............... 705/51 |
| 2002/0013772 A1 | 1/2002 | Peinado |
| 2002/0016921 A1 | 2/2002 | Olsen et al. |
| 2002/0016922 A1* | 2/2002 | Richards et al. ............ 713/200 |
| 2002/0023208 A1 | 2/2002 | Jancula |
| 2002/0026321 A1 | 2/2002 | Faris et al. |
| 2002/0027886 A1 | 3/2002 | Fischer et al. |
| 2002/0029340 A1 | 3/2002 | Pensak et al. |
| 2002/0031230 A1 | 3/2002 | Sweet et al. |
| 2002/0035624 A1 | 3/2002 | Kim |
| 2002/0036984 A1 | 3/2002 | Chiussi et al. |
| 2002/0041391 A1 | 4/2002 | Bannai |
| 2002/0042756 A1 | 4/2002 | Kumar et al. |
| 2002/0046350 A1 | 4/2002 | Lordemann et al. |
| 2002/0050098 A1 | 5/2002 | Chan |
| 2002/0052981 A1 | 5/2002 | Yasuda |
| 2002/0056042 A1 | 5/2002 | Van Der Kaay et al. |
| 2002/0062240 A1 | 5/2002 | Morinville |
| 2002/0062245 A1 | 5/2002 | Niu et al. |
| 2002/0062451 A1 | 5/2002 | Scheidt et al. |
| 2002/0069077 A1 | 6/2002 | Brophy et al. |
| 2002/0069272 A1 | 6/2002 | Kim et al. |
| 2002/0069363 A1 | 6/2002 | Winburn |
| 2002/0073320 A1 | 6/2002 | Rinkevich et al. |
| 2002/0077986 A1 | 6/2002 | Kobata et al. |
| 2002/0077988 A1 | 6/2002 | Sasaki et al. |
| 2002/0078239 A1 | 6/2002 | Howard et al. |
| 2002/0078361 A1 | 6/2002 | Giroux et al. |
| 2002/0087479 A1 | 7/2002 | Malcolm |
| 2002/0089602 A1 | 7/2002 | Sullivan |
| 2002/0091532 A1 | 7/2002 | Viets et al. |
| 2002/0091745 A1* | 7/2002 | Ramamurthy et al. ....... 709/100 |
| 2002/0091928 A1 | 7/2002 | Bouchard et al. |
| 2002/0093527 A1 | 7/2002 | Sherlock et al. |
| 2002/0099947 A1 | 7/2002 | Evans |
| 2002/0112035 A1* | 8/2002 | Carey ............... G06F 17/30867 709/219 |
| 2002/0112048 A1 | 8/2002 | Gruyer et al. |
| 2002/0120851 A1 | 8/2002 | Clarke |
| 2002/0124180 A1 | 9/2002 | Hagman |
| 2002/0129158 A1 | 9/2002 | Zhang et al. |
| 2002/0129235 A1 | 9/2002 | Okamoto et al. |
| 2002/0133500 A1 | 9/2002 | Arlein et al. |
| 2002/0133699 A1 | 9/2002 | Pueschel |
| 2002/0138571 A1 | 9/2002 | Trinon et al. |
| 2002/0138726 A1 | 9/2002 | Samson et al. |
| 2002/0138762 A1 | 9/2002 | Horne |
| 2002/0143710 A1 | 10/2002 | Uu |
| 2002/0143906 A1 | 10/2002 | Tormasov et al. |
| 2002/0147746 A1 | 10/2002 | Lee |
| 2002/0150239 A1 | 10/2002 | Carny et al. |
| 2002/0152302 A1 | 10/2002 | Motoyama et al. |
| 2002/0156726 A1 | 10/2002 | Kleckner et al. |
| 2002/0157016 A1 | 10/2002 | Russell et al. |
| 2002/0162104 A1 | 10/2002 | Raike et al. |
| 2002/0165870 A1 | 11/2002 | Chakraborty et al. |
| 2002/0166053 A1 | 11/2002 | Wilson |
| 2002/0169963 A1 | 11/2002 | Seder et al. |
| 2002/0169965 A1 | 11/2002 | Hale et al. |
| 2002/0172367 A1 | 11/2002 | Mulder et al. |
| 2002/0174030 A1 | 11/2002 | Praisner et al. |
| 2002/0174109 A1 | 11/2002 | Chandy et al. |
| 2002/0174415 A1 | 11/2002 | Hines |
| 2002/0176572 A1 | 11/2002 | Ananth |
| 2002/0178271 A1 | 11/2002 | Graham et al. |
| 2002/0184217 A1 | 12/2002 | Bisbee et al. |
| 2002/0184488 A1 | 12/2002 | Amini et al. |
| 2002/0194484 A1 | 12/2002 | Bolosky et al. |
| 2002/0198798 A1 | 12/2002 | Ludwig et al. |
| 2003/0009685 A1 | 1/2003 | Choo et al. |
| 2003/0014391 A1 | 1/2003 | Evans et al. |
| 2003/0023559 A1 | 1/2003 | Choi et al. |
| 2003/0005168 A1 | 2/2003 | Leerssen et al. |
| 2003/0026431 A1 | 2/2003 | Hammersmith |
| 2003/0028610 A1 | 2/2003 | Pearson |
| 2003/0033528 A1 | 2/2003 | Ozog et al. |
| 2003/0037029 A1 | 2/2003 | Holenstein et al. |
| 2003/0037133 A1 | 2/2003 | Owens |
| 2003/0037237 A1 | 2/2003 | Abgrall et al. |
| 2003/0037253 A1 | 2/2003 | Blank et al. |
| 2003/0046176 A1 | 3/2003 | Hynes |
| 2003/0046238 A1 | 3/2003 | Nonaka et al. |
| 2003/0046270 A1 | 3/2003 | Leung et al. |
| 2003/0050919 A1 | 3/2003 | Brown et al. |
| 2003/0051039 A1 | 3/2003 | Brown et al. |
| 2003/0056139 A1 | 3/2003 | Murray et al. |
| 2003/0061482 A1 | 3/2003 | Emmerichs |
| 2003/0061506 A1 | 3/2003 | Cooper |
| 2003/0074580 A1* | 4/2003 | Knouse et al. ............... 713/201 |
| 2003/0078959 A1 | 4/2003 | Yeung et al. |
| 2003/0079175 A1 | 4/2003 | Limantsev |
| 2003/0081784 A1 | 5/2003 | Kallahalla et al. |
| 2003/0081785 A1 | 5/2003 | Boneh et al. |
| 2003/0081787 A1 | 5/2003 | Kallahalla et al. |
| 2003/0081790 A1 | 5/2003 | Kallahalla et al. |
| 2003/0088517 A1 | 5/2003 | Medoff |
| 2003/0088783 A1 | 5/2003 | DiPierro |
| 2003/0093457 A1 | 5/2003 | Goldick |
| 2003/0095552 A1 | 5/2003 | Bernhard et al. |
| 2003/0099248 A1 | 5/2003 | Speciner |
| 2003/0101072 A1 | 5/2003 | Dick et al. |
| 2003/0110131 A1 | 6/2003 | Alain et al. |
| 2003/0110169 A1 | 6/2003 | Zuili |
| 2003/0110266 A1 | 6/2003 | Rollins et al. |
| 2003/0110280 A1 | 6/2003 | Hinchliffe et al. |
| 2003/0110397 A1 | 6/2003 | Supramaniam |
| 2003/0115146 A1 | 6/2003 | Lee et al. |
| 2003/0115218 A1 | 6/2003 | Bobbitt et al. |
| 2003/0115570 A1 | 6/2003 | Bisceglia |
| 2003/0120601 A1 | 6/2003 | Ouye |
| 2003/0120684 A1* | 6/2003 | Zuili et al. ................ 707/200 |
| 2003/0126434 A1 | 7/2003 | Lim et al. |
| 2003/0132949 A1 | 7/2003 | Fallon et al. |
| 2003/0154296 A1 | 8/2003 | Noguchi et al. |
| 2003/0154381 A1 | 8/2003 | Ouye |
| 2003/0154396 A1 | 8/2003 | Godwin et al. |
| 2003/0154401 A1 | 8/2003 | Hartman et al. |

(56) References Cited

U.S. PATENT DOCUMENTS

| | | |
|---|---|---|
| 2003/0159048 A1 | 8/2003 | Matsumoto et al. |
| 2003/0159066 A1 | 8/2003 | Staw et al. |
| 2003/0163704 A1 | 8/2003 | Dick et al. |
| 2003/0165117 A1 | 9/2003 | Garcia-Luna-Aceves et al. |
| 2003/0172280 A1 | 9/2003 | Scheidt et al. |
| 2003/0177070 A1 | 9/2003 | Viswanath et al. |
| 2003/0177378 A1 | 9/2003 | Wittkotter |
| 2003/0182310 A1 | 9/2003 | Charnock et al. |
| 2003/0182579 A1 | 9/2003 | Leporini et al. |
| 2003/0182584 A1 | 9/2003 | Banes et al. |
| 2003/0191938 A1 | 10/2003 | Woods et al. |
| 2003/0196096 A1 | 10/2003 | Sutton |
| 2003/0197729 A1 | 10/2003 | Denoue et al. |
| 2003/0200202 A1 | 10/2003 | Hsiao et al. |
| 2003/0204692 A1 | 10/2003 | Tamer et al. |
| 2003/0208485 A1 | 11/2003 | Castellanos |
| 2003/0217264 A1 | 11/2003 | Martin et al. |
| 2003/0217281 A1 | 11/2003 | Ryan |
| 2003/0217282 A1 | 11/2003 | Henry |
| 2003/0217333 A1 | 11/2003 | Smith et al. |
| 2003/0220999 A1 | 11/2003 | Emerson |
| 2003/0222141 A1 | 12/2003 | Vogler et al. |
| 2003/0226013 A1 | 12/2003 | Dutertre |
| 2003/0233650 A1 | 12/2003 | Zaner et al. |
| 2004/0003293 A1 | 1/2004 | Viets et al. |
| 2004/0022390 A1 | 2/2004 | McDonald et al. |
| 2004/0025037 A1 | 2/2004 | Hair |
| 2004/0039781 A1 | 2/2004 | LaVallee et al. |
| 2004/0041845 A1 | 3/2004 | Alben et al. |
| 2004/0049702 A1 | 3/2004 | Subramaniam et al. |
| 2004/0064507 A1 | 4/2004 | Sakata et al. |
| 2004/0064710 A1 | 4/2004 | Vainstein |
| 2004/0068524 A1 | 4/2004 | Aboulhosn et al. |
| 2004/0068664 A1 | 4/2004 | Nachenberg et al. |
| 2004/0073660 A1 | 4/2004 | Toomey |
| 2004/0073718 A1 | 4/2004 | Johannessen et al. |
| 2004/0088548 A1 | 5/2004 | Smetters et al. |
| 2004/0098580 A1 | 5/2004 | DeTreville |
| 2004/0103202 A1 | 5/2004 | Hildebrand et al. |
| 2004/0103280 A1 | 5/2004 | Balfanz et al. |
| 2004/0117371 A1 | 6/2004 | Bhide et al. |
| 2004/0131191 A1 | 7/2004 | Chen et al. |
| 2004/0133544 A1 | 7/2004 | Kiessig et al. |
| 2004/0158586 A1 | 8/2004 | Tsai |
| 2004/0186845 A1 | 9/2004 | Fukui |
| 2004/0193602 A1 | 9/2004 | Liu et al. |
| 2004/0193905 A1 | 9/2004 | Lirov et al. |
| 2004/0193912 A1 | 9/2004 | Li et al. |
| 2004/0199514 A1 | 10/2004 | Rosenblatt et al. |
| 2004/0205576 A1 | 10/2004 | Chikirivao et al. |
| 2004/0215956 A1 | 10/2004 | Venkatachary et al. |
| 2004/0215962 A1 | 10/2004 | Douceur et al. |
| 2004/0243853 A1 | 12/2004 | Swander et al. |
| 2004/0254884 A1 | 12/2004 | Haber et al. |
| 2005/0021467 A1 | 1/2005 | Franzdonk |
| 2005/0021629 A1 | 1/2005 | Smith et al. |
| 2005/0028006 A1 | 2/2005 | Leser et al. |
| 2005/0039034 A1 | 2/2005 | Doyle et al. |
| 2005/0050098 A1 | 3/2005 | Barnett |
| 2005/0071275 A1 | 3/2005 | Vainstein et al. |
| 2005/0071657 A1 | 3/2005 | Ryan |
| 2005/0071658 A1 | 3/2005 | Nath et al. |
| 2005/0081029 A1 | 4/2005 | Thornton et al. |
| 2005/0086531 A1 | 4/2005 | Kenrich |
| 2005/0091289 A1 | 4/2005 | Shappell et al. |
| 2005/0091484 A1 | 4/2005 | Thornton et al. |
| 2005/0097061 A1 | 5/2005 | Shapiro et al. |
| 2005/0120199 A1 | 6/2005 | Carter |
| 2005/0138371 A1 | 6/2005 | Supramaniam |
| 2005/0138383 A1 | 6/2005 | Vainstein |
| 2005/0168766 A1 | 8/2005 | Troyansky et al. |
| 2005/0177716 A1* | 8/2005 | Ginter ............... G06F 21/10 713/157 |
| 2005/0177858 A1 | 8/2005 | Ueda |
| 2005/0193397 A1 | 9/2005 | Corenthin et al. |
| 2005/0198326 A1 | 9/2005 | Schlimmer et al. |
| 2005/0223242 A1 | 10/2005 | Nath |
| 2005/0223414 A1 | 10/2005 | Kenrich et al. |
| 2005/0235154 A1 | 10/2005 | Serret-Avila |
| 2005/0256909 A1 | 11/2005 | Aboulhosn et al. |
| 2005/0268033 A1 | 12/2005 | Ogasawara et al. |
| 2005/0273600 A1 | 12/2005 | Seeman |
| 2005/0283610 A1 | 12/2005 | Serret-Avila et al. |
| 2005/0288961 A1 | 12/2005 | Tabrizi |
| 2006/0005021 A1 | 1/2006 | Torrubia-Saez |
| 2006/0011400 A1 | 1/2006 | Thomas |
| 2006/0075258 A1 | 4/2006 | Adamson et al. |
| 2006/0075465 A1 | 4/2006 | Ramanathan et al. |
| 2006/0093150 A1 | 5/2006 | Reddy et al. |
| 2006/0101285 A1 | 5/2006 | Chen et al. |
| 2006/0149407 A1 | 7/2006 | Markham et al. |
| 2006/0168147 A1 | 7/2006 | Inoue et al. |
| 2006/0184637 A1 | 8/2006 | Hultgren et al. |
| 2006/0230437 A1 | 10/2006 | Boyer et al. |
| 2006/0277316 A1 | 12/2006 | Wang et al. |
| 2007/0006214 A1 | 1/2007 | Dubal et al. |
| 2007/0067837 A1 | 3/2007 | Schuster |
| 2007/0083575 A1 | 4/2007 | Leung et al. |
| 2007/0192478 A1 | 8/2007 | Louie et al. |
| 2007/0193397 A1 | 8/2007 | Corenthin et al. |
| 2007/0294368 A1 | 12/2007 | Bomgaars et al. |
| 2008/0034205 A1 | 2/2008 | Alain et al. |
| 2008/0075126 A1 | 3/2008 | Yang |
| 2009/0100268 A1 | 4/2009 | Garcia et al. |
| 2009/0254843 A1 | 10/2009 | Van Wie et al. |
| 2009/0254972 A1 | 10/2009 | Huang et al. |
| 2010/0047757 A1 | 2/2010 | McCurry et al. |
| 2010/0199088 A1 | 8/2010 | Nath |
| 2011/0258438 A1 | 10/2011 | Hildebrand |
| 2011/0296199 A1 | 12/2011 | Kinghorn et al. |
| 2011/0307937 A1 | 12/2011 | Hildebrand et al. |
| 2012/0137130 A1 | 5/2012 | Vainstein et al. |
| 2014/0075206 A1 | 3/2014 | Garcia et al. |
| 2014/0201850 A1 | 7/2014 | Garcia et al. |

FOREIGN PATENT DOCUMENTS

| | | |
|---|---|---|
| EP | 0 674 253 A1 | 9/1995 |
| EP | 0 809 170 A1 | 11/1997 |
| EP | 0 862 105 A2 | 9/1998 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 B1 | 6/2001 |
| EP | 1 107504 A2 | 6/2001 |
| EP | 1 130 492 A2 | 9/2001 |
| EP | 1 143 665 A2 | 10/2001 |
| EP | 1 154 348 A2 | 11/2001 |
| EP | 1 320 012 A2 | 6/2003 |
| EP | 1324565 A1 | 7/2003 |
| GB | 2 328 047 A | 2/1999 |
| JP | 2001-036517 | 2/2001 |
| JP | 2006-244044 A | 9/2006 |
| JP | 2007257529 A * | 10/2007 ........... G06F 21/608 |
| JP | 2009-020720 A | 1/2009 |
| WO | WO 96/41288 A1 | 12/1996 |
| WO | WO 98/53410 A2 | 11/1998 |
| WO | WO 00/56028 | 9/2000 |
| WO | WO 00/79434 A1 | 12/2000 |
| WO | WO 01/61438 A2 | 8/2001 |
| WO | WO 01/63387 A2 | 8/2001 |
| WO | WO 01/67705 A2 | 9/2001 |
| WO | WO 01/77783 A2 | 10/2001 |
| WO | WO 01/78285 A1 | 10/2001 |
| WO | WO 01/84271 A2 | 11/2001 |

OTHER PUBLICATIONS

Microsoft Windows 2000 Server. Windows 2000 Group Policy White Paper, 2000.

Symantec. Norton Antivirus Corporate Edition Implementation Guide, 1999.

(56) References Cited

OTHER PUBLICATIONS

Stallings, William, "Cryptography and Network Security: Principles and Practice," 1999, pp. 333-337, Second Edition, Prentice Hall, Upper Saddle River, New Jersey.
U.S. Appl. No. 10/076,254, Alain Rossmann, Method and Architecture for Providing Pervasive Security to Digital Assets, filed Feb. 12, 2002.
U.S. Appl. No. 10/159,537, Denis Jacques Paul Garcia, Method and Apparatus for Securing Digital Assets, filed May 31, 2002.
U.S. Appl. No. 10/159,220, Gary Mark Kinghorn, Method and System for Protecting Electronic Data in Enterprise Environment, filed May 31, 2002.
U.S. Appl. No. 10/259,075, Steven Toye Crocker, Effectuating Access Policy Changes to Designated Places for Secured Files, filed Sep. 27, 2002
U.S. Appl. No. 10/325,013, Alain Rossmann, Hybrid Systems for Securing Digital Assets, filed Dec. 20, 2002.
U.S. Appl. No. 10/325,102, Nalini J. Prakash, Method and Apparatus for Securing/Unsecuring Files by File Crawling, filed Dec. 20, 2002
U.S. Appl. No. 10/259,078, Michael Michio Ouye, Managing File Access Via a Designated Place, filed Sep. 27, 2002
U.S. Appl. No. 10/404,566, Steven Toye Crocker, Multi-Level Cryptographic Transformations for Securing Digital Assets, filed Mar. 31, 2003.
U.S. Appl. No. 10/405,587, Satyajit Nath, Method and System for Securing Digital Assets Using Content Type Designations, filed Apr. 1, 2003.
U.S. Appl. No. 10/677,049, Satyajit Nath, Method and System for Securing Digital Assets Using Process-Driven Security Policies, filed Sep. 30, 2003.
U.S. Appl. No. 10/676,474, Klimenty Vainstein, Method and Apparatus for Transitioning Between States of Security Policies Used to Secure Electronic Documents, filed Sep. 30, 2003.
U.S. Appl. No. 10/676,850, Nicholas M. Ryan, Method and System for Securing Digital Assets Using Time-Based Security Criteria, filed Sep. 30, 2003.
U.S. Appl. No. 10/690,243, Michael Frederick Kenrich, Method and System for Proxy Approval of Security Changes for a File Security System, filed Oct. 20, 2003.
U.S. Appl. No. 10/815,251, Satyajit Nath, Method and System for Providing Document Retention Using Cryptography, filed Mar. 30, 2004.
U.S. Appl. No. 10/815,229, Michael Frederick Kenrich, Method and System for Providing Cryptographic Document Retention with Off-Line Access, filed Mar. 30, 2004.
U.S. Appl. No. 10/894,493, Michael Frederick Kenrich, Multi-Level File Digests, filed Jul. 19, 2004.
"Inside Encrypting File System," Part 1, from MSDN Oct. 2001 version, exact publication date is unknown but believed to be prior to Dec. 12, 2001.
"Inside Encrypting File System," Part 2, from MSDN Oct. 2001 version, exact publication date is unknown but believed to be prior to Dec. 12, 2001.
"Security with Encrypting File System," from MSDN Oct. 2001 version, exact publication date is unknown but believed to be prior to Dec. 12, 2001.
"How EFS Works," from MSDN Oct. 2001 version, exact publication date is unknown but believed to be prior to Dec. 12, 2001.
"Encrypting File System," from MSDN Oct. 2001 version, exact publication date is unknown but believed to be prior to Dec. 12, 2001.
"Features of EFS," from MSDN Oct. 2001 version, exact publication date is unknown but believed to be prior to Dec. 12, 2001.
"Windows 2000 EFS," in the Apr. 1999 issue of Windows NT Magazine.
"Expiration Mechanism for Chipcards," ibm Technical Disclosure Bulletin, Oct. 1, 2001, UK.

McDaniel et al., "Antigone: A Flexible Framework for Secure Group Communication," Proceedings of the 8th USENIX Security Symposium, Aug. 23, 1999.
Expiration Mechanism for Chipcards, IBM Technical Disclosure Bulletin, Oct. I, 2001, UK.
McDaniel et al. "Antigone: A Flexible Framework for Secure Group Communication," Proceedings of the 8th USENIX Security Symposium, Aug. 23, 1999.
Crocker, Steven Toye, "Multi-level cryptographic transformations for securing digital assets,"U.S. Appl. No. 10/404,566, filed Mar. 31, 2003.
Crocker, Steven Toye, "Effectuating access policy changes to designated places for secured files," U.S. Appl. No. 10/259,075, filed Sep. 27, 2002.
Kenrich, Michael Frederick, "Multi-Level File Digest", U.S. Appl. No. 10/894,493, filed Jul. 19, 2004.
Kinghorn, Gary Mark, "Method and system for protecting electronic data in enterprise environment,"U.S. Appl. No. 10/159,220, filed May 31, 2002.
Nath, Satyajit, "Method and system for securing digital assets using content type designations," U.S. Appl. No. 10/405,587, filed Apr. 1, 2003.
Prakash, Nalini J., "Method and apparatus for securing/unsecuring files by file crawling," U.S. Appl. No. 10/325,102, filed Dec. 20, 2002.
Rossmann, Alain, "Hybrid systems for securing digital assets," U.S. Appl. No. 10/325,013, filed Dec. 20, 2002.
A Real-Time Push-Pull Communications Model for Distributed Real-Time and Multimedia Systems, Jan. 1999, School of Computer Sciences Carnegie Mellon University, Kanaka Juvva, Raj Rajkumar.
U.S. Appl. No. 10/889,685, entitled "Method and Apparatus for Controlling the Speed Ranges of a Machine" inventor Thomas, Jul. 13, 2004, 18 pgs.
U.S. Appl. No. 10/028,397, entitled "Method and system for restricting use of a clipboard application," inventor Zuili, Dec. 21, 2001, 38 pgs.
U.S. Appl. No. 10/368,277, entitled "Method and apparatus for uniquely identifying files," inventor Ouye, Feb. 18, 2003, 25 pgs.
U.S. Appl. No. 10/327,320, entitled "Security system with staging capabilities" inventor Vainstein, Dec. 20, 2002, 39 pgs.
U.S. Appl. No. 10/286,524, entitled "Security system that uses indirect password-based encryption," inventor Gutnik, Nov. 1, 2002, 38 pgs.
U.S. Appl. No. 10/242,185, entitled "Method and system for protecting encrypted files transmitted over a network" inventor Ryan, Sep. 11, 2002, 33 pgs.
U.S. patent application, Ser No. 10/642,041, entitled "Method and system for fault-tolerant transfer of files across a network" inventor Kenrich, Aug. 15, 2003, 32 pgs.
U.S. Appl. No. 10/610,832, entitled "Method and system for enabling users of a group shared across multiple file security systems to access secured files" inventor Ryan, Jun. 30, 2003, 33 pgs.
U.S. Appl. No. 10/448,806, entitled "Method and System for Using Remote Headers to Secure Electronic Files" inventor Ryan, May 30, 2003, 35 pgs.
U.S. Appl. No. 10/074,194, entitled "Methods for idnetifying compunds that inhibit or reduce PTP1B expressions" inventor Rondinone, Feb. 12, 2002, 69 pgs.
U.S. Appl. No. 10/074,804, entitled "Secured Data Format for Access Control," inventor Garcia, Feb. 12, 2002, 108 pgs.
U.S. Appl. No. 10/075,194, entitled "System and Method for Providing Multi-location Access Management to Secured Items," inventor Vainstein et al., Feb. 12, 2002, 110 pgs.
U.S. Appl. No. 10/074,996, entitled "Method and Apparatus for Securing Electronic Data," inventor Lee et al., Feb. 12, 2002, 1 1 1 pgs.
U.S. Appl. No. 10/074,825, entitled "Method and Apparatus for Accessing Secured Electronic Data Off-line," inventor Lee et al., Feb. 12, 2002, 108 pgs.
U.S. Appl. No. 10/105,532, entitled "System and Method for Providing Different Levels of Key Security for Controlling Access to Secured Items," inventor Hildebrand et al., Mar. 20, 2002, 86 pgs.

(56) References Cited

OTHER PUBLICATIONS

U.S. Appl. No. 10/186,203, entitled "Method and System for Implementing Changes to Security Policies in a Distributed Security System," inventor Huang, Jun. 26, 2002, 65 pgs.
U.S. Appl. No. 10/201,756, entitled "Managing Secured Files in Designated Locations," inventor Alain, Jul. 22, 2002, 121 pgs.
U.S. Appl. No. 10/206,737, entitled "Method and System for Updating Keys in a Distributed Security System," inventor Hildebrand, Jul. 26, 2002, 60 pgs.
U.S. Appl. No. 10/246,079, entitled "Security System for Generating Keys from Access rules in a Decentralized Manner and Methods Therefor," inventor Hildebrand, Sep. 17, 2002, 78 pgs.
U.S. Appl. No. 10/259,075, entitled "Effectuating Access Policy Changes to Designated Places for Secured Files," inventor Crocker, Sep. 27, 2002, 60 pgs.
U.S. Appl. No. 10/286,575, entitled "Method and Architecture for Providing Access to Secured Data from Non-Secured Clients," inventor Vainstein, Nov. 1, 2002, 46 pgs.
U.S. Appl. No. 10/295,363, entitled "Security System Using Indirect Key Generation from Access Rules and Methods Therefor," inventor Vainstein, Nov. 15, 2002, 70 pgs.
U.S. Appl. No. 11/889,310, entitled "Methods and Systems for Providing Access Control to Electronic Data," inventor Rossmann, Aug. 10, 2007, 90 pgs.
U.S. Appl. No. 11/797,367, entitled "Method and System for Managing Security Tiers," inventor Vainstein, May 2, 2007, 11 pgs.
Adobe Acrobat 5.0 Classroom in a Book, Adobe Press, Jun. 26, 2001, pp. 1-4.
Adobe Acrobat Security Settings, Acrobat 7.0, Nov. 15, 2004, pp. I-4.
"Security Options". Dec. 20, 2001. DC & Co. pages 1-2.
Microsoft Press Computer Dictionary, 1997, Microsoft Press, Third Edition, p. 426.
Search Report, completion date May 8, 2003, for European Patent Application No. EP 02 25 8530, 2 pages.
Search Report, completion date Oct. 2, 2003, for European Patent Application No. EP 02 25 8531, 2 pages.
Search Report, completion date Apr. 14, 2005, for European Patent Application No. EP 02 25 8533, 2 pages.
Search Report, completion date Mar. 16, 2005, for European Patent Application No. EP 02 25 8534, 2 pages.
Search Report, completion date Mar. 2, 2005, for European Patent Application No. EP 02 25 8535, 2 pages.
Search Report, completion date Mar. 3, 2005, for European Patent Application No. EP 02 25 8537, 2 pages.
Search Report, completion date May 12, 2005, for European Patent Application No. EP 02 25 8539, 2 pages.
Search Report, completion date Jul. 6, 2005, for European Patent Application No. EP 02 25 8529, 4 pages.
Search Report, completion date Oct. 8, 2003, for European Patent Application No. EP 02 25 8536, 2 pages.
Search Report, completion date May 8, 2003, for European Patent Application No. EP 02 25 8540, 2 pages.
Examination Report, completion date Jun. 18, 2008, for European Patent Application No. EP 02 258 532.7-1244, 6 pgs.
Boneh et al., "Hierarchical Identity Based Encryption with Constant Size Ciphertext," Advances in Cryptology—EUROCRYPT 2005, vol. 3493, Jun. 20, 2005, pp. 440-456.
Boneh et al., "IBE Secure E-mail," Stanford University, Apr. 8, 2002, http://crypto.stanford.edu/ibe/.
Curtis et al., "Securing the Global, Remote, Mobile User," 1999 John Wiley & Sons, Ltd., Int. J. Network Mgmt. 9, pp. 9-21.
"Secure Sockets Layer (SSL): How it Works," Verisign, http://www.verisign.com/ssl/ssl-information-center/how-ssl-security-works, pp. 1-2.
"Column Archives," Microsoft TechNet, Professor Windows, technet.microsoft.com/enus/library/bb878075.aspx, retrieved on Dec. 3, 2009.
"Columns," Microsoft TechNet http://web.archive.org/web/20021014225142/www.microsoft.com/techneUcolumns/default.asp Oct. 14, 2002, Retrieved from web.archive.org on Dec. 3, 2009.
"eXPeriencing Remote Assistance" Microsoft TechNet—Professor Windows Oct. 2002 Oct. 15, 2002 http://web.archive.org/web/20021015165237/www.microsoft.com/technUcolumns/profwin/, Retrieved from web.archive.org on Dec. 3, 2009.
Juvva et al. "A Real-Time Push-Pull Communications Model for Distributed Real-Time and Multimedia Systems," Jan. 1999, School of Computer Sciences Carnegie Mellon University.
"Migrating Accounts From Windows NT 4.0 Domains to Windows 2000," Microsoft TechNet—Professor Windows Apr. 2002, http://web.archive.org/web/20020415004611/www. microsoft.com/technetlcolu mns/profwin/, Apr. 15, 2002.
"Scripting Your Windows 2000 Network, Part 1" Microsoft TechNet—Professor Windows Jun. 2002, http://web.archive.org/web/20020622055532/www.microsoft.com/techneUcolumns/profwin/ Retrieved from web.archive.org on Dec. 3, 2009.
"WayBack Machine" web.archive.org, http://web.archive.org/web/*/http://www.microsoft.com/technetlcolumns/profwin/, Retrieved on Dec. 3, 2009.
English language translation (unverified, machine-generated) of Japanese Patent Publication No. JP 2006-244044, Japanese Patent Office, Patent & Utility Model Gazette DB, 2006.
English language translation (unverified, machine-generated) of Japanese Patent Publication No. 2009-020720, Japanese Patent Office, Patent & Utility Model Gazette DB, 2009.
Office Action, dated May 10, 2005, for European Patent Application No. 02258532.7, 5 pgs.
Office Action, dated Dec. 5, 2006, for European Patent Application No. 02258532.7, 5 pgs.
English language abstract for Japanese Appl. No. 2001-036517, filed Feb. 9, 2001, 1 pg.
Botha et al., "Access Control in Document-Centric Workflow Systems—An Agent-Based Approach," Computers & Security, vol. 20:6, Sep. 2001, pp. 525-532.
Botha et al., "Separation of Duties for Access Control Enforcement in Workflow Environments," IBM, 2001.
"Affect," The American Heritage Dictionary of the English Language, Fourth Edition Houghton Mifflin Company, 2002. Retrieved on May 4, 2006 from http://dictionary.reference.com/search?q=affect.
U.S. Appl. No. 60/475,109, Leser et al., "Method for Enforcing and Managing Usage Rights of Digital Data Objects in Dynamic, Distributed and Collaborative Contexts", filed Jun. 2, 2003.
Boneh, D., et al., "Identity-Based Encryption from the Weil Pairing", CRYPTO '01 Proceedings of the 21st Annual International Cryptology Conference on Advances in Cryptology, Springer-Verlag London, UK, Oct. 2001, 27 pages.
Office Action, dated Oct. 5, 2005, for European Patent Application No. 02258532.7, European Patent Office, 5 pages.
Office Action, dated May 12, 2006, for European Patent Application No. 02258532.7, European Patent Office, 5 pages.
U.S. Appl. No. 12/331,083, entitled "Method and Apparatus for Securing Digital Assets," Garcia, filed Dec. 9, 2008, 32 pages.
Kahan J.: "WDAI: a simple World Wide Web distributed authorization infrastructure" Computer Networks, Elsevier Science Publishers B.V., vol. 31, No. 11-16, May 17, 1999, pp. 1599-1609.
Donald, L., "Windows 2000 Server Study Guide Passage" Windows 2000 Server Study Guide, Jun. 20, 2001, pp. 3, 345-346, 380.

\* cited by examiner

```
<header>
  <header_version>
    1.0
  </header_version>
  <key_blocks_list>
    <key_blocks_list_version>
      1.0
    </key_blocks_list_version>
    <key_block>
      <key_block_version>
        1.0
      </key_block_version>
      <group_id> www.xyz.com/marketing </group_id>
      <** /* encrypted with Marketing's public-key */
      <group_id> www.xyz.com/marketing </group_id>
      <crypto>
        <dek_mat>P39GJ439833IOOE93I5UR93U3945U439</dek_mat>          170
        <enc_algo>
        <name>
          RIJNDAEL
        </name>
        <key_size> 256 </key_size>
        <block_size> 128 </block_size>
        </enc_algo>
        <ses_enc_block_size> 4096 </ses_enc_block_size>
      </crypto>
    **>                                                              167
    </key_block>
    <key_block>
      <key_block_version> 1.0 </key_block_version>
      <group_id> www.xyz.com/engineering </group_id>
      <** /* encrypted with User1_Trivial_Group's public-key */
      <group_id> www.xyz.com/engineering </group_id>
      <crypto>
        <dek_mat>P39GJ439833IOOE93I5UR93U3945U439</dek_mat>          170
        <enc_algo>
        <name>
          RIJNDAEL
        </name>
        <key_size> 256 </key_size>
        <block_size> 128 </block_size>
        </enc_algo>
        <ses_enc_block_size> 4096 </ses_enc_block_size>
      </crypto>
    **>                                                              168
    </key_block>
  </key_blocks_list>
  <rule_blocks_list>
    <rule_block_list_version> 1.0 </rule_block_list_version>
    <secure-info encryption="dek" block-size="1024">
      <rule_block version="1.0">
        <group_id> www.xyz.com/marketing </group_id>
        <rule_xml_string>  ...  </rule_xml_string>
      </rule_block>
      <rule_block version="1.0">                                     171
        <group_id> www.xyz.com/engineering </group_id>
        <rule_xml_string>  ...  </rule_xml_string>
      </rule_block>
    </secure-info>                                                   172
  </rule_blocks_list>
</header>
```

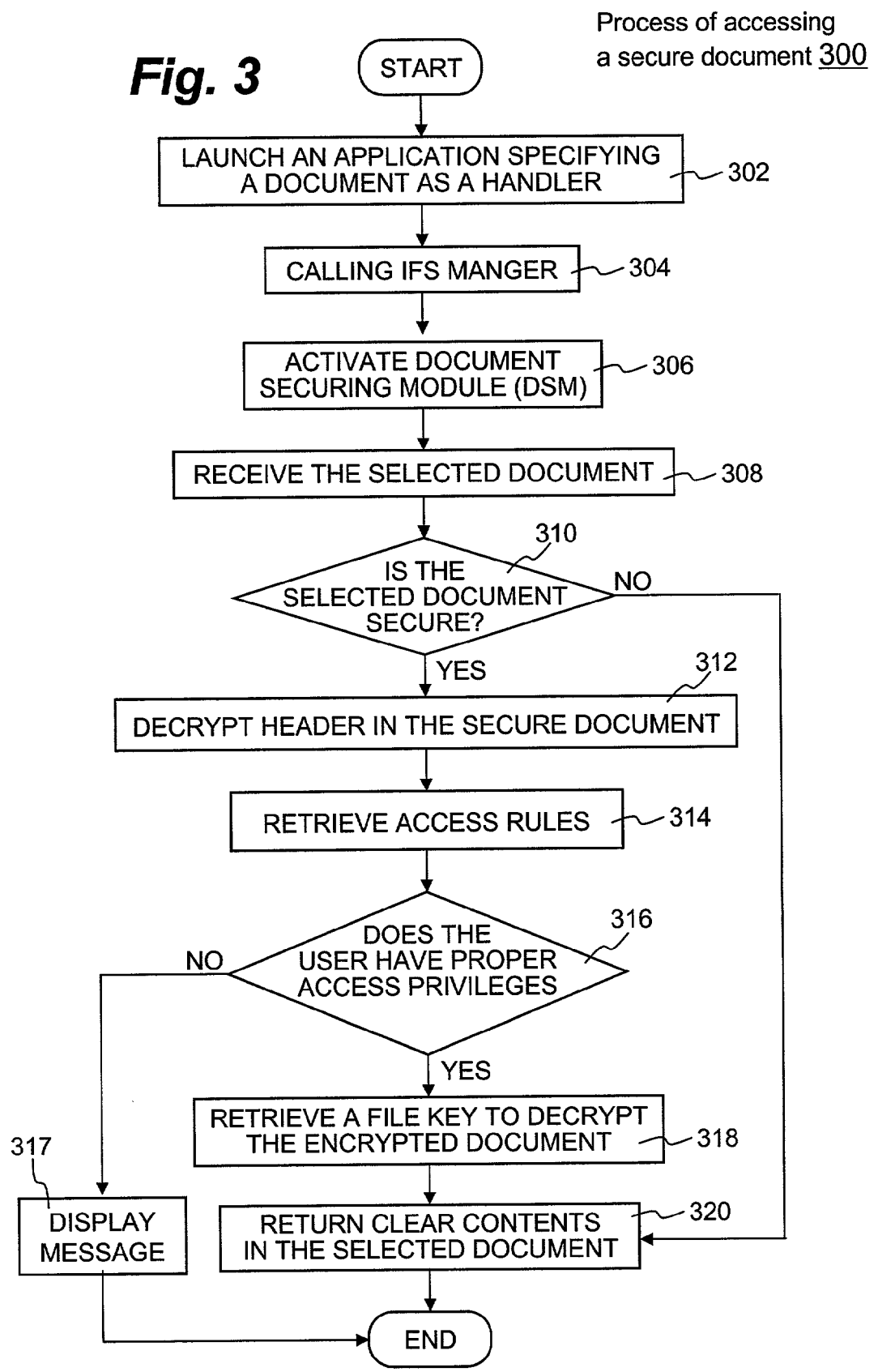

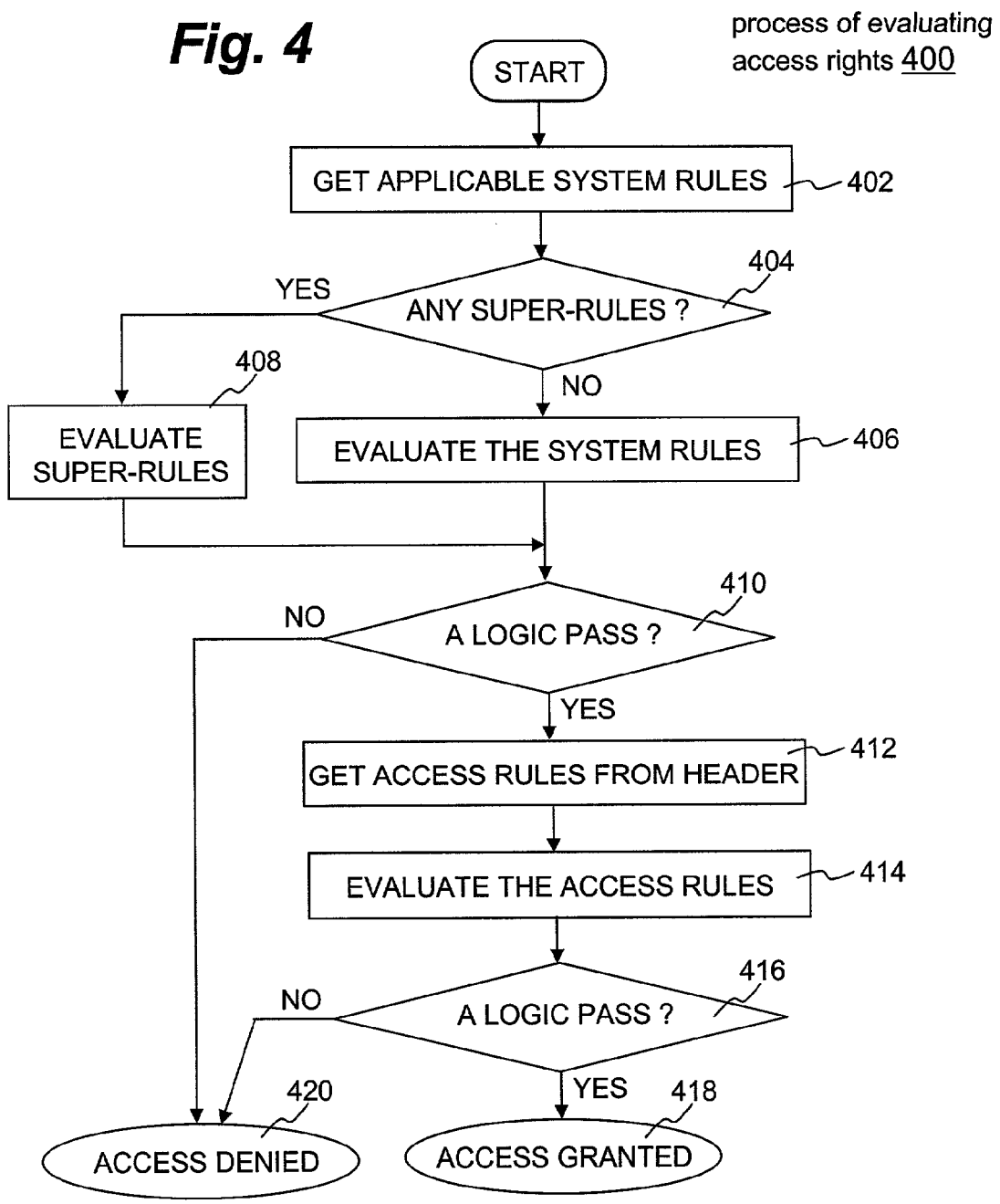

DYNAMIC EVALUATION OF ACCESS RIGHTS

CROSS-REFERENCE TO RELATED APPLICATION

This application is a continuation-in-part of U.S. patent application Ser. No. 10/076,254, filed Feb. 12, 2002, now U.S. Pat. No. 7,260,555 and entitled "Method and Architecture for Providing Pervasive Security to Digital Assets", which claims the benefits of U.S. Provisional Application No. 60/339,634, filed Dec. 12, 2001, and entitled "Pervasive Security Systems," both are hereby incorporated by reference for all purposes.

BACKGROUND OF THE INVENTION

1. Field of the Invention

The present invention relates to the area of protecting data in an enterprise environment, and more particularly, relates to processes, systems, methods and software products for evaluating access rights to a protected system or secured digital assets.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is a widely open, public and international network of interconnected computers and electronic devices. Without proper security means, an unauthorized person or machine may intercept any information traveling across the Internet and even get access to proprietary information stored in computers that interconnect to the Internet, but are otherwise generally inaccessible by the public.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day hundreds of thousands of people interact electronically, whether it is through e-mail, e-commerce (business conducted over the Internet), ATM machines, or cellular phones. The perpetual increase of information transmitted electronically has lead to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an insecure communication channel without disclosing the contents of the information to anyone eavesdropping on the communication channel. Using an encryption process in a cryptographic technique, one party can protect the contents of the data in transit from access by an unauthorized third party, yet the intended party can read the data using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of the Internet, contractual information, customer data, executive communications, product specifications, and a host of other confidential and proprietary intellectual property remains available and vulnerable to improper access and usage by unauthorized users within or outside a supposedly protected perimeter.

A governmental report from General Accounting Office (GAO) details "significant and pervasive computer security weaknesses at seven organizations within the U.S. Department of Commerce, the widespread computer security weaknesses throughout the organizations have seriously jeopardized the integrity of some of the agency's most sensitive systems."Further it states: "Using readily available software and common techniques, we demonstrated the ability to penetrate sensitive Commerce systems from both inside Commerce and remotely, such as through the Internet," and "Individuals, both within and outside Commerce, could gain unauthorized access to these systems and read, copy, modify, and delete sensitive economic, financial, personnel, and confidential business data . . . " The report further concludes "[i]ntruders could disrupt the operations of systems that are critical to the mission of the department."

In fact, many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary information residing on private networks. For example, depending on passwords to access sensitive documents from within often causes security breaches when the password of a few characters long is leaked or detected. Therefore, there is a need to provide more effective ways to secure and protect digital assets at all times.

SUMMARY OF INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

The present invention is related to a process, a system, a method and a software product for evaluating access rights to a protected system or secured electronic data or digital assets. In one aspect of the present invention, a protected system employs one or more levels of access policy. When a user attempts to access the system, the access policy is dynamically evaluated against the user's access privilege. Unless the evaluation is successful, the user would not be permitted to access the system. In another aspect of the present invention, the digital assets are in a form that only those with granted access rights can access. To grant or deny access rights to a user attempting to access a secured file, an access right evaluation process is carried out among all applicable policies including those embedded in the secured file. In a preferred embodiment, the access right evaluation process is invoked only when a file being accessed is detected secured. Further, the access right evaluation process is configured to operate transparently to the user.

Rules exist as part of a policy to guard a protected system or secured electronic data. According to one embodiment of the present invention, all applicable system rules as well as access rules embedded in a secure file are individually evaluated in the access right evaluation process. If there is a single logic failure from the evaluation of each of items in the system rules as well as the access rules, an access right to the secured file is denied. On the other hand, if each of the items in the system rules as well as the access rules is respectively evaluated and all produce a logic pass, an access right to the secured file is granted.

Depending on implementation and application, the present invention may be employed in a client machine and/or a server machine. Typically, if a user's access right to a secured file is locally determined in a client machine, the present invention may be implemented as an executable module configured to operate in an operating system running in the client machine. If a user's access right to a secured file is remotely determined in a server machine, the present invention may be implemented as an executable module configured to operate in the server machine. Alternatively, the access right evaluation process may be implemented in a distributed manner, namely, one part of the access right evaluation process is carried out in one computing device for one policy and another part of the access right evaluation process is carried out in another computing device for another policy. The evaluation results are subsequently and logically combined in a computing device to determine if a user is ultimately permitted to access a protected system or a secured file. Typically, the user is associated with the computing device from which the user can access the protected system or the secured file, if granted the access.

One of the objects in the present invention is to provide a dynamic access rights evaluation mechanism that can protect a system or secured digital assets at all times.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 1E shows an exemplary header corresponding to that of the secured document structure in FIG. 1D, wherein the header includes a number of segments, some are encrypted as the security information for the secured document structure.

FIG. 3 shows a flowchart of process of accessing a secured document according to one embodiment of the present invention and may be understood in conjunction with FIG. 2; and FIG. 4 shows a flowchart of process of carrying out the access evaluation test according to one embodiment of the present invention.

DETAILED DESCRIPTION OF THE PREFERRED EMBODIMENTS

Figure 1A:
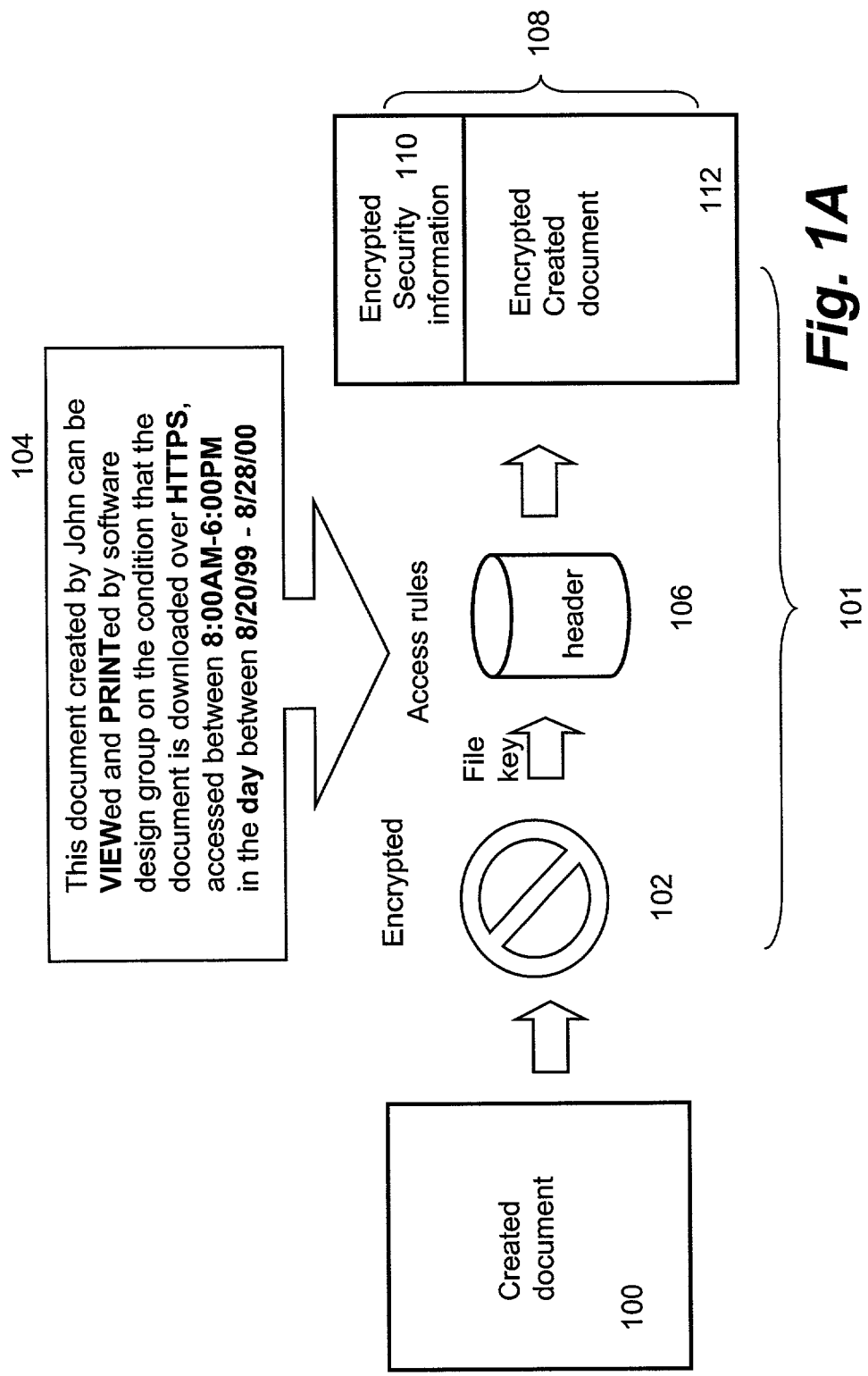
FIG. 1A shows an illustration diagram of securing a created document according to one exemplary secured file form used in the present invention.

The present invention pertains to a process, a system, a method and a software product for evaluating access rights to a protected system or secured electronic data or digital assets. As used herein, an access right or access rights are a permit, or a right to proceed forward. For example, a user may seek an access right to enter a protected system (e.g., a device, a database, a directory) or to request an act on a secured item (e.g., to print a file or delete a folder). In one aspect of the present invention, a protected system employs one or more levels of access policy. When a user attempts to access the system, the access policy is dynamically evaluated against the user's access privilege. Unless the evaluation is successful, the user would not be permitted to access the system. In another aspect of the present invention, the digital assets are in a form that only those with granted access rights can access. To grant or deny access rights to a user attempting to access a secured file, an access right evaluation process is carried out among all applicable policies including those embedded in the secured file. In a preferred embodiment, the access right evaluation process is invoked only when a file being accessed is detected to be in a secured format. Further, the access right evaluation process is configured preferably to operate transparently to the user. The present invention may be advantageously used in a system in which electronic data is secured and can be restrictively accessed by those who are authenticated and have the access privilege.

In the following description, numerous specific details are set forth in order to provide a thorough understanding of the present invention. However, it will become obvious to those skilled in the art that the present invention may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-4. However, those skilled in the art will readily appreciate that the detailed description given herein with respect to these figures is for explanatory purposes as the invention extends beyond these limited embodiments.

Generally, content created by a creator for the purpose of an entity is an intellectual property belonging to the creator or the entity. In an enterprise, any kind of information or intellectual property can be content, though it is commonly referred to as "information" instead of "content". In either case, content or information is independent of its format, it may be in a printout or an electronic document. As used herein, content or information exists in a type of electronic data that is also referred to as a digital asset. A representation of the electronic data may include, but not be limited to, various types of documents, multimedia files, streaming data, dynamic or static data, executable code, images and texts.

To prevent contents in electronic data from unauthorized access, the electronic data is typically stored in a form that is as close to impossible as possible to read without a priori knowledge. Its purpose is to ensure privacy by keeping the content hidden from anyone for whom it is not intended, even those who have access to the electronic data. Example of a priori knowledge may include, but not be limited to, a password, a secret phrase, biometric information or one or more keys.

Relying upon a priori knowledge to guard a system or a secured file is not always secure. For example, when a password or a secret phrase is leaked to or hacked by an intruder, the security of a system or a secured file can be breached. To provide pervasive security to protected systems or secured files, it is desirable to employ at least one level of access rules that measure against a user's access privilege. Together with one or more levels of system rules, preferably imposed implicitly, protected systems or secured files can be secured at all times.

FIG. 1A shows an illustration diagram of securing a created document 100 according to one exemplary secured file form used in the present invention. One of the purposes is to ensure that the contents in the document 100 can be only accessed by an authorized user. As used herein, the user may mean a human user, a software agent, a group of users, a device and/or application(s). Besides a human user who needs to access a secured document, a software application or agent sometimes needs to access the secured document in order to proceed forward. Accordingly, unless specifically stated, the "user" as used herein does not necessarily pertain to a human being.

After the document 100 is created with an application or authoring tool (e.g., Microsoft WORD), upon an activation of a "Save," "Save As" or "Close" command or automatic saving invoked by an operating system, the application itself, or an application that is previously registered with the server, the created document 100 is caused to undergo a securing process 101. The securing process 101 starts with an encryption process 102, namely the document 100 that has been created or is being written into a store is encrypted by a cipher with a file key. In other words, the encrypted document could not be opened without the file key (i.e., a cipher key). For the purpose of controlling the access to the document, the file key or keys may be the same or different keys for encryption and decryption and are preferably included in the security information contained in or pointed to by the header and, once obtained, can be used to decrypt the encrypted document.

A set of access rules 104 for the document 100 is received and associated with a header 106. In general, the access rules 104 determine or regulate who and/or how the document 100, once secured, can be accessed. In some cases, the access rules 104 also determine or regulate when or where the document 100 can be accessed. Typically, a header is a file structure, small in size and includes, or perhaps links to, security information about a resultant secured document. Depending on an exact implementation, the security information can be entirely included in a header or pointed to by a pointer that is included in the header. According to one embodiment, the access rules 104, as part of the security information, is included in the header 106. The security information further includes the file key and, in some cases, an off-line access permit (e.g. in the access rules) should such access be requested by an authorized user. The security information is then encrypted by a cipher with a user key associated with an authorized user to produce encrypted security information 110. The encrypted header 106, if no other information is added thereto, is attached to the encrypted document 112 to generate a secured document 108.

It is understood that a cipher may be implemented based on one of many encryption/decryption schemes. Examples of such schemes may include, but not be limited to, Data Encryption Standard algorithm (DES), Blowfish block cipher and Twofish cipher. Therefore, the operations of the present invention are not limited to a choice of those commonly-used encryption/decryption schemes. Any encryption/decryption scheme that is effective and reliable may be used. Hence, the details of encryption/decryption schemes are not further discussed herein so as to avoid obscuring aspects of the present invention.

In essence, the secured document 108 includes two parts, the document itself and the corresponding security information therefor, both are in encrypted form. To access the document, one needs to obtain the file key that is used to encrypt the document and is now included in the encrypted security information. To obtain the file key, one needs to be authenticated to get a user or group key and pass an access test in which the access rules in the security information are measured against the user's access privilege (i.e. access rights).

Figure 1B:
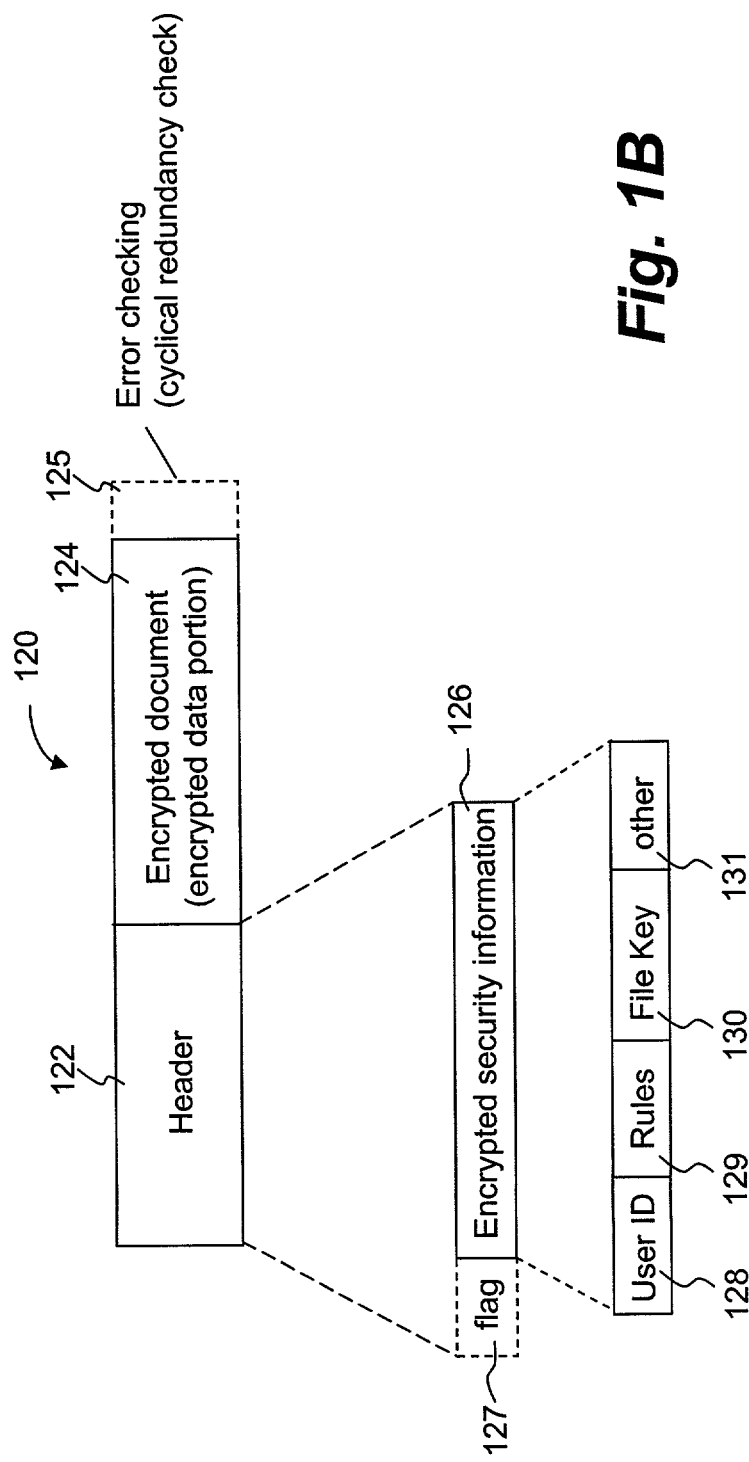
FIG. 1B illustrates an exemplary structure of a secured document including a header and an encrypted data portion.

FIG. 1B illustrates an exemplary structure of a secured document 120 including a header 122 and an encrypted data portion 124 in accordance with the secured document 108 in FIG. 1A. The header 122 includes a security information block 126 having encrypted security information that essentially controls the access to the encrypted data portion or document 124. In a certain implementation, the header 122 includes a flag 227 (e.g., a predetermined set of data) to indicate that the document 120 is secured. The security information block 126 includes one or more user IDs 128, access rules 129, at least one file key 130 and other information 131. The user IDs 128 maintain a list of authorized users who may be measured against by the access rules 129 before the file key 130 can be retrieved. The access rules 129 determine at least who and how the encrypted document 124 can be accessed. Depending on an implementation, the other information 131 may be used to include other information facilitating a secure access to the encrypted document 124, the example may include version numbers or author identifier.

To ensure that the key is not to be retrieved or accessed by anyone, the key itself is guarded by the access rights and rules. If a user requesting the document has the proper access rights that can be granted by the access rules, the key will be retrieved to proceed with the decryption of the encrypted document.

To ensure that the security information or the header (if no flag is implemented) is not readily revealed, the header itself is encrypted with a cipher. Depending on an exact implementation, the cipher for the header may or may not be identical to the one used for the document. The key (referred to as a user key) to decrypt the encrypted header can, for example, be stored in a local store of a client machine or in a server machine and activated only when the user associated with it is authenticated. As a result, only an authorized and authenticated user can access the secured document.

Figure 1C:
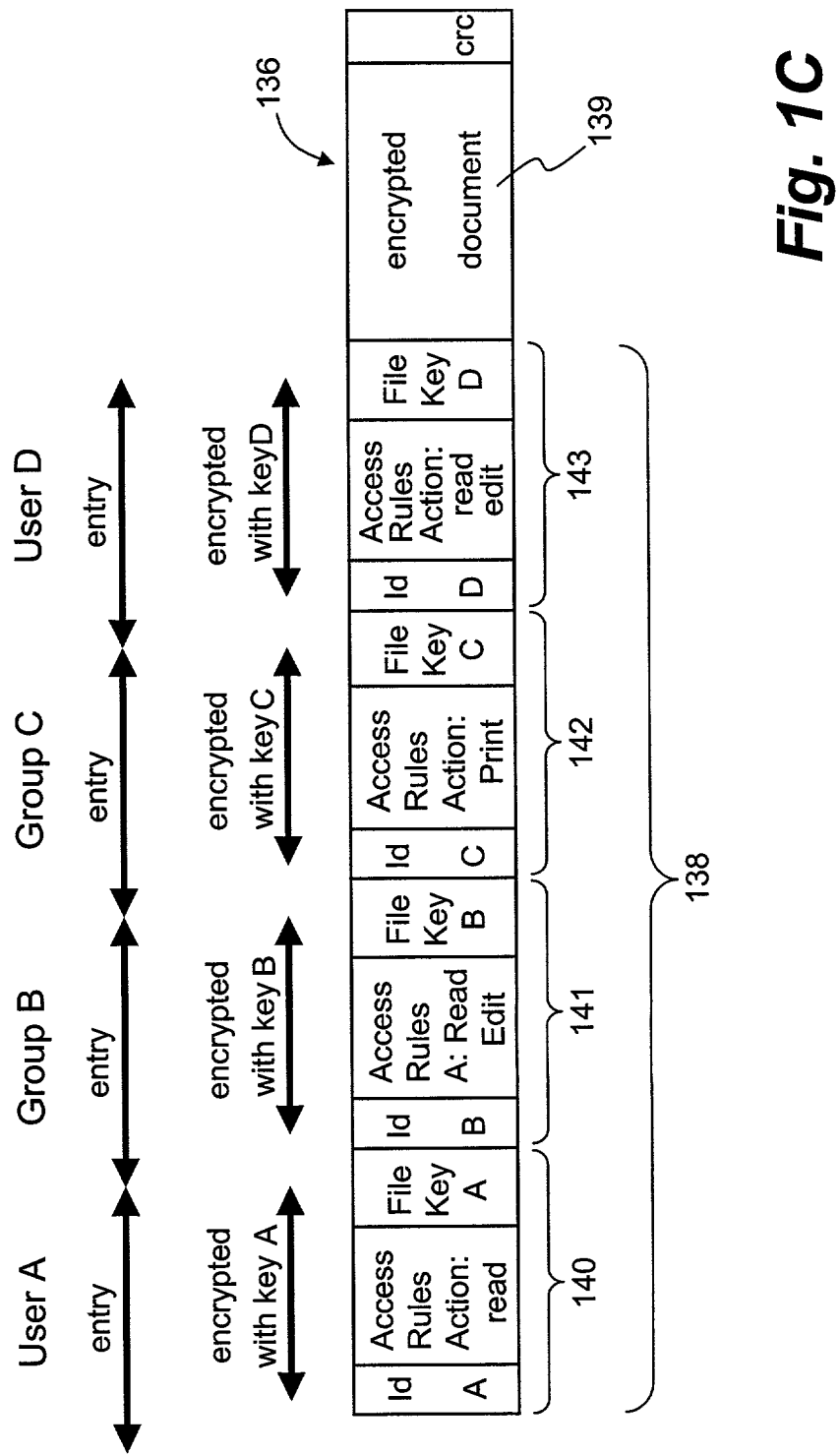
FIG. 1C illustrates another exemplary structure of a secured document including a header and an encrypted portion, wherein the header permits four different entities to access the secured document.

FIG. 1C illustrates an exemplary structure of a secured document 136 including a header 138 and an encrypted portion 139. The header 138 permits four different 140-143 entities to access the secured document 136. The four different entities 140-143 include two individual users and two group users, wherein the group users mean that everyone in a group could access the document with the same privileges. The two individual users have two different access privileges. User A can only read the document while user D can edit and read the document. While everyone in Group B can read and edit the document, everyone in Group C can only print the document. Each entity has a corresponding ID to be associated with the corresponding users and its own access rules. According to one embodiment, the header 138 in the secured document 136 is partitioned into corresponding four sub-headers 140-143, each designated to one user or group and keeping a file key therein and encrypted with a separate user key. In other words, when User A is requesting the secured document 136, only the header 140 designated to User A is decrypted with a user key (e.g., key A) belonging to the user A and authenticated with the user, the rest of the sub-headers 141-143 remain encrypted. In any case, once one of the sub-headers 141-143 is decrypted, the secured document can be decrypted with a key (e.g., file key) retrieved from the decrypted sub-header.

Figure 1D:
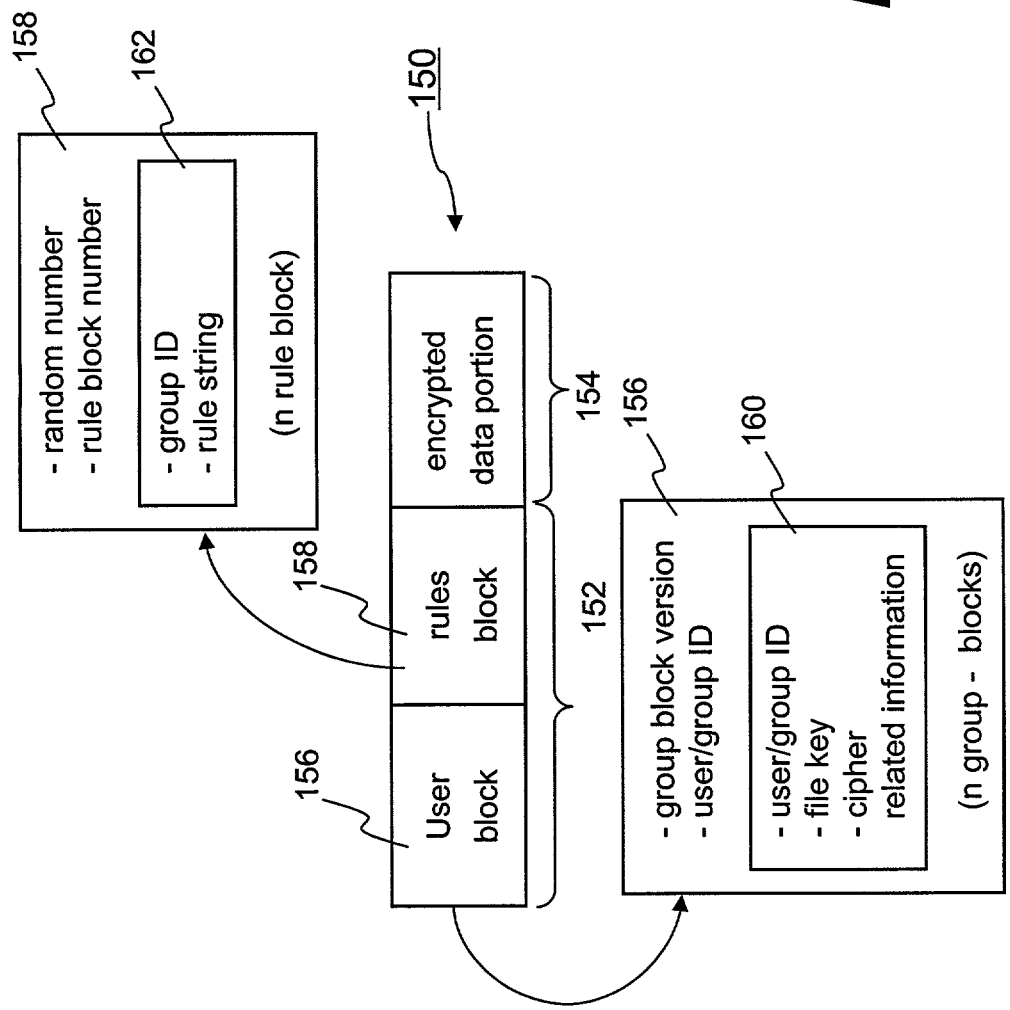
FIG. 1D illustrates another exemplary structure of a secured document including a header and an encrypted portion, wherein the header further includes a user block and a rules block.

FIG. 1D illustrates another exemplary structure of a secured document 150 including a header 152 and an encrypted portion 154. The header 152 further includes a user block 156 and a rules block 158. The user block 156 includes a clear portion and an encrypted portion 160. The clear portion includes user/group ID(s) and block version number(s). The encrypted portion 160 is encrypted with a user key according to a cipher. If there are N number of distinctive groups/users with possible different access privileges, there will be N such encrypted portions, each encrypted with a corresponding user key. The encrypted portion 160 includes, among other things, the file key that, once retrieved, can be used to decrypt the encrypted data portion 154. In addition, the encrypted portion 160 includes the cipher information to facilitate the encryption/decryption of the encrypted portion 154.

The rules block 158 can be encrypted individually or with the encrypted document 154 using the file key that is eventually stored in the user block 156. One of the advantages of using the file key instead of the individual user key to encrypt the rules block 158 is to provide a mechanism for all authorized users/groups to view who has what access rules and rights. According to one embodiment, a random number or a result from an initialization process (e.g. a vector) may be added in the beginning of the rules block 158 to prevent an attack against the rules block 158.

FIG. 1E shows an exemplary header 166 corresponding to that of the secured document structure in FIG. 1D. The header 166 includes a number of segments. In addition to those segments in clear mode, segments 167-169 are encrypted. Specifically, the secured file is configured to be accessed by two groups: marketing and engineering. All users in the two groups are supposed to be able to access the file with an authenticated user key. According to one embodiment, the segment 167 is encrypted with a user key specifically designated to marketing users, while the segment 168 is encrypted with a user key specifically designated to engineering. However, both of the segments 167 and 168 could be respectively encrypted with a single user key. In any event, the encrypted segments in the header 166 include a file key 170 in addition to corresponding cipher information about the cipher being used.

The rules block (i.e., a segment) 169 includes two sets 171 and 172 of access rules (details on rules not shown), one for each of the two user groups. The rules block 169 is encrypted with a key, such as the file key 170 or some other key depending on what cipher is used. According to one embodiment, one of the encrypted segments in the user blocks 167 and 168 shall be decrypted 169 with an authenticated user key to retrieve the file key 170. Before the file key 170 is applied to the decryption of the encrypted data portion, the rules block 169 is decrypted with the file key 170. The access rules are then measured against the access privilege of the user. If the user is not permitted to access the secured document, the file key 170 will not be applied to the decryption of the encrypted data portion. If the user is permitted to access the secured document, the file key 170 will then be applied to the decryption of the encrypted data portion.

Depending on implementation and application, a rule set (e.g. the block 171 or 172) may be described in many ways and in binary data or texts. According to one embodiment, a rule set is expressed in a descriptive language such as a markup language (e.g., XML as shown in FIG. 1E). The following shows an exemplary simplified rule:

```
<ruleStatement ruleId="rule_001" >
    <comment>This rule just demonstrates the structure of an
    XACML rule</comment>
    <target>
        <subjects>
            ... specify a set of users, e.g. members of Marketing
        </subjects>
        <resources>
            ... specify a set of resources, e.g. *.doc files
        </resources>
        <actions>
            ... specify what to do if this rule passes, e.g. allow access
        </actions>
    </target>
    <effect>permitIf</effect>
    <condition>
        <and>
            ... nested boolean expressions
        </and>
    </condition>
</ruleStatement>
```

There are certain parameters that control the outcome of the evaluation of the rule set:

Target: The target of a rule specifies sets of subjects, resources and actions to which this rule applies by giving values for attributes of the subject, resource and action. For a rule to apply, the attribute values given in the target subject, target resource, and target action must all match the attributes given directly or indirectly in the request. The target has subject, resource and action components. A target must match the request in all three components to be applicable.

Subject: in one embodiment, the subject is a list of users or groups of users or memberships. An authorized or validated user must be a member of at least one of these groups for the rule to apply with respect to the subject.

Resource: one attribute type in the resource is a resource type, e.g., names.doc.

Action: according to one embodiment, a list of actions may include:
  Access—right to access the contents of the encrypted file.
  GrantAccess—right to grant Access to other groups and the right to grant GrantAccess
  Protect—"right" to protect the specific file
  Offline—"right" to keep keys to work while offline
  Effect—meaning of passing the condition on this rule, at least three types of effects:
    permitIf: at least one rule of this type must pass.
    permitOnlyIf: all of these rules must be true.
    denyIf: any rule of this type being true causes the request to be denied.
Condition: This is a boolean expression using operators such as AND, OR, NOT with some additional predicates listed below.
  DocumentSuffix (<extension>):
    TRUE if the document type matches the <extension>
    Extension is a three letter suffix to the document following a period.
  ServerAccessible (<list of URL's>):
    TRUE if one of the URL's on the list is accessible
  DocumentClearance (<clearance>):
    TRUE if the document clearance level matches <clearance>
    Clearance must be one of classified, Classified, secret, Secret, TopSecret or topsecret
  TimeOfDayInRange (start, stop):
    TRUE if the current time of day is between start and stop,
    Start and stop are given in terms of a 24 hour clock in the form hh:mm:ss
  DayOfWeekRestriction (<list of allowed days in week>):
    TRUE if the day of the week is in the list.
    Days are given by their names in English or by integers in the range 1 to 7, 1 indicating Monday.
  DayOfMonthRestriction (<list of allowed days in month>):
    TRUE if the day in the month is in the list.
    Day in the month is given by an integer in the range 1 to 31.
  MonthRestriction (<list of months>):
    TRUE if the month is in the list
    Months are given by their names in English or by integers in the range 1 to 12, 1 indicating January.
  MemberOfGroup (<group>):
    True if the user is a member of the specified group In an alternative implementation, the file key necessary to decrypt the document may be encrypted alone and kept in a separate block in the header. The file key becomes retrievable when one of the sub-headers (no longer keeping the file key) is decrypted. In still another alternative implementation, one or more flags or messages may be included in the security information of a secured document, the flags or messages indicate how secure the secured document can be. For example, a secured document can be classified as a normal, confidential, secret or a top-secret document, requiring different level of access. Accordingly, multiple-levels of encryption on the file key and/or access rules may be employed to ensure that only an authorized user or users are permitted to access the secured document.

It should be noted that FIGS. 1B, 1C, 1D and 1E are only exemplary structures of a secured document employing access rules. One of the features in the present invention is an evaluation mechanism (i.e. an access test) that dynamically evaluates system rules and the access rules in a secured item against the access privilege (i.e. rights) associated with a user requesting the secured item. With the description herein, those skilled in the art will understand that the technique can be equally applied to other implementations of secured items (e.g. various types of documents, multimedia files, streaming data, dynamic or static data, executable code, images and texts).

Figure 2:
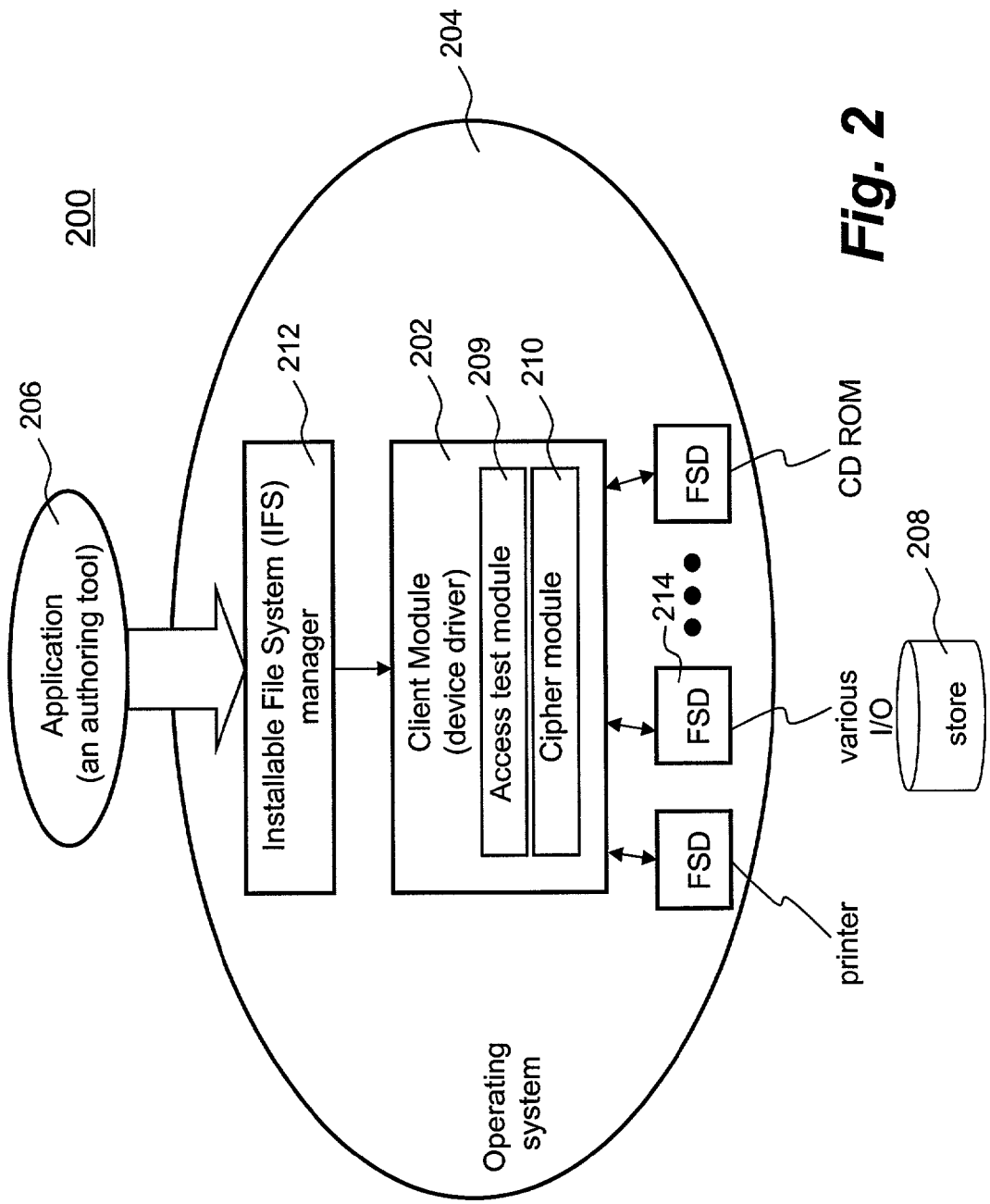
FIG. 2 shows an exemplary implementation of how the access right test may be carried out, in particular, a client module includes an access test or evaluation module representing an executable version of the present invention and is configured to interact with and operate within an operating system to ensure that a document is made secured and a secured document can be accessed only by an authorized user.

FIG. 2 shows an exemplary implementation 200 of how the access right test may be carried out. A client module 202 includes an access test or evaluation module representing an executable version of the present invention and is configured to interact with and operate within an operating system 204 (e.g., WINDOWS 2000/NT/XP) to ensure that a document is made secured and a secured document can be accessed only by an authorized user. One of the features of the client module 202 is that the operations thereof are transparent to the user. In other words, the user is not made aware of the operations of the client module 202 when accessing a secured document.

An application 206 (e.g. a registered application, such as Microsoft Word) operates over operating system (OS) 204 and may be activated to access a document stored in a store 208. The store 208 may be a local storage place (e.g., hard disk) or remotely located (e.g., another device). Depending on the security nature (secured vs. non-secured) of the document being accessed, the client module 202 may activate an access test module 209 and a cipher module 210. According to one embodiment, the client module 202 is analogous in many ways to a device driver that essentially converts more general input/output instructions of an operating system to messages that a device/module being supported can understand. Depending on the OS in which the present invention is implemented, DSM may be implemented as a VxD (virtual device driver), a kernel or other applicable format. The access test module 209 and the cipher module 310 are included in or controlled by the client module 202 and can be activated for operations when a secured document is involved.

In operation, a user selects a document that is associated with an application 206 (e.g., MS WORD, PowerPoint, or printing). The application 206 acts on the document and calls an API (e.g., createFile, a Common Dialog File Open Dialog with Win32 API in MS Windows) to access the installable file system (IFS) manger 212. If it is detected that an "Open" request is made from the application 206, the request is passed to an appropriate file system driver (FSD) 214 to access the requested document. When it is detected that the requested document is secured, the access test module 209 and the cipher module 210 are activated and an authenticated user (private) key is retrieved. It is assumed that the authenticated user key is from a local store. The encrypted security information in the header of the requested secure document is decrypted with the user key. Now the access rules in the secured document are available, the access test module 209 starts a rules measurement to determine if the user is permitted to access the selected secured document, assuming applicable system rules, if there are any, have been measured successfully. If the measurement is successful, that means the user is permitted to access the secured document, a file key is retrieved from the security information and the cipher module 210 proceeds to decrypt the encrypted document in the client module 202. The clear contents are then returned to the application 206 through the IFS manager 212. For example, if the application 206 is an authoring tool, the clear contents are displayed. If the application 206 is a printing tool, the clear contents are sent to a designated printer.

In another embodiment, an operating system (OS) access, known as the ProcessID property, can be used to activate an application (as an argument to the AppActivate method). The parameter ProcessID identifies the application and an event handler thereof takes necessary parameters to continue the OS access to the Installable File System (IFS) Manager 212 that is responsible for arbitrating access to different file system components. In particular, the IFS Manager 312 acts as an entry point to perform various operations such as opening, closing, reading, writing files and etc. With one or more flags or parameters passed along, the access activates the client module 202. If the document being accessed by the application is regular (non-secured), the document will be fetched from one of the File System Driver (FSD) (e.g., FSD 214) and passed through the client module 202 and subsequently loaded into the application through the IFS Manager 212. On the other hand, if the document being accessed by the application is secured, the client module 202 activates the access test module 209 and the cipher module 210 and proceeds to obtain an authenticated user key to retrieve the access rules therein. Pending the outcome from the access test module 209, a file key may be retrieved to decrypt the encrypted data portion of the secured document by the cipher in the cipher module 210. As a result, the data portion or the document in clear mode will be loaded into the application through the IFS Manager 212.

In a system that facilitates restricted access to a protected system or secured items (i.e. digital data or assets), one or more levels of access rules may be employed, all shall be evaluated logically, mutually and, perhaps, jointly. Unless all access rules are evaluated to produce a logic pass or "true", a protected system or a secured item would not be permitted to be accessed. Examples of the access rule sets include, but may not be limited to, one or more system access rule sets governing a user's access privilege, an access rules sets retrieved from a secured item. To facilitate the description of the access test module 209, an access rule set may be expressed in a tabular form as follows:

| Type | Right | Resource | Principal | Condition | Action |
|---|---|---|---|---|---|

According to one embodiment, the tabular form includes 6 types of items or parts, a rule type, a right set, a resource expression, a principal expression, a condition expression and an action. In general, each of the rule items in a rule or rule set shall be evaluated so that the rule is considered to have been evaluated. The rule type defines how the rules shall be treated in the overall evaluation. In this embodiment, the rule type includes Authorization, and Restriction. Among all rule sets, at least one Authorization type must be true to grant an access right. All applicable Restriction types must be true to grant the access right. According to one embodiment, a system rule set may be classified as Regular and Super. A system rule set being Regular means that the rule set is to be evaluated together with other system rules, if there are any. Likewise, a system rule set being Super means that the rule set is to be evaluated without considering Regular system rules. In other words, a Super rule or rule set is an override mechanism used to force either a grant or a denial of the access right regardless of the other Regular rule(s). Typically, a Super rule is used by a system administrator to grant a special access right to a user who otherwise would not get in a normal setting.

The right set indicates which rights are associated with this rule. It is a set of rights, multiple rights can be controlled with the same rule. The resource expression defines a set of documents on which the rules operate. The criteria for the documents include, but not limited to, type, creator and modifier. The principal expression defines a set of users to which the rule is applicable. The criteria for users may include a single user or a group membership. The condition expression validates global information such as: current date/time, login data/time, last authentication data/time, machine, network connection state, and possibly site-based variables. The action field is used to determine an execution of a certain activity when this rule returns true. It is typically used for rules involving changes in access rights but is generalized to allow future expansion.

For example, a document rule block in a secured document contains rules (i.e. implicit policies). In one case, these rules simply authorize an associated group for a decrypt right. Depending on implementation, the rule set could be more complex or include different rule types:

| Type | Right | Resource | Principal | Condition | Action |
|---|---|---|---|---|---|
| Authorize | Decrypt | THIS | THIS | true | |

In particular, there are implicit arguments to the rules applicable to THIS (self) because of the tight coupling to a document and group.

To better understand the system level policies, it is assumed that the access (via document rule) has been granted in the following examples. A rule set that indicates that all .doc files are encrypted may be written as:

| Type | Right | Resource | Principal | Condition | Action |
|---|---|---|---|---|---|
| Authorize | Encrypt | Type.(DOC) | memberOf(Everyone) | true | |

In this example, the encrypt right is authorized if the document type is .DOC and the user is a member of Everyone. It shall be noted that the "Encrypt" right is really treated as an enforcement of the encryption system. Any time the encrypt right is asserted, the system will encrypt the file.

To extend the above example to include .xls files, one possible way to create the resource expression is as follows:

| Type | Right | Resource | Principal | Condition | Action |
|---|---|---|---|---|---|
| Authorize | Encrypt | Type.(doc) \| Type(.xls) | memberOf(Everyone) | | |

Alternately this can be separated into two rules:

| Type | Right | Resource | Principal | Condition | Action |
|---|---|---|---|---|---|
| Authorize | Encrypt | Type.(doc) | memberOf(Everyone) | | |
| Authorize | Encrypt | Type(.xls) | memberOf(Everyone) | | |

It should be noted that, in this form, only one of the rules can be optionally selected for evaluation because of the matching resource type (.doc or .xls).

A rule that can be only applied to documents created after a certain date could be written as:

| Type | Right | Resource | Principal | Condition | Action |
|---|---|---|---|---|---|
| Authorize | Encrypt | Type(.doc) | memberOf(Marketing) | createDate > date(1,9,2002) | |

It shall be noted that this rule only applies when the user is a member of the marketing group.

In general, the condition portion of the rule is useful for evaluating a global context in which the rule is being evaluated, for example whether the user is connected to the network or not:

| Type | Right | Resource | Principal | Condition | Action |
|---|---|---|---|---|---|
| Restriction | Decrypt | Type(any) | memberOf(Everyone) | connected | |

This rule may prevent any document from being decrypted by anyone when a client machine is not connected to a specific network. Likewise, a policy that would allow only the Marketing group to work offline may be expressed something like:

| Type | Right | Resource | Principal | Condition | Action |
|---|---|---|---|---|---|
| Authorize | Decrypt | Type(any) | memberOf(Everyone) | connected | |
| Authorize | Decrypt | Type(any) | memberOf(Marketing) | !connected | |

Essentially, it authorizes Everyone access while connected to a network in the first rule, and then it allows the Marketing group access when the condition is not connected. To limit the duration of how long someone could work offline, the condition could be extended to include a time limit from the lastLogin Date/Time, e.g. !connected & duration (lastLogin, now)<5 days In addition, a series of functions can be provided for manipulations of time/date data types, duration (date, date), month (date), day (date), year (date), hour (date), minute (date), before (date, date), after (date, date).

As described above, the Action field in the rule is used to execute a procedure when a rule is involved in an evaluation that generates a positive (true) result. This field is targeted to be used in folder rules to allow the rule to grant access:

| Type | Right | Resource | Principal | Condition | Action |
|---|---|---|---|---|---|
| Authorize | Assign | THIS folder | memberOf(Everyone) | | Grant(Marketing) |

The "Assign" right is used by the client module to determine if assignments (e.g. rights changes) are to be done when this rule passes.

Rules exist as part of a policy to guard a protected system or secured electronic data. There may be many policies in use across a system at different levels. It is generally understood to those skilled in the art that various levels of rules may be employed and jointly evaluated to determine whether an access right to a selected secured item is granted or denied. Examples of the various levels of rules may include one or more system rule sets at a server machine and/or a client machine, a special (Super) rule set imposed by a system operator and the rule set associated with or embedded in a secured file.

To facilitate the description of the rule evaluation process, referring now to FIG. 3, there is shown a flowchart of process 300 of accessing a secured document according to one embodiment of the present invention and may be understood in conjunction with FIG. 2. At 302, an application is launched with a document being specified, for example, WINWORD.EXE is activated to open a file named xyz.doc. As explained above, a handler from the OS identifies the application and enters the OS wherein the IFS manger is called upon at 304. The IFS manger activates a client module at 306 and at the same time, the IFS manger passes the handler to receive at 308 the selected document from a store. As the selected document passes through the client module, the selected document is "intercepted" and determined whether it is secured or non-secured at 310. If the client module determines that the selected document is not secured, the process 300 goes to 320, namely, the selected document is allowed to pass through the client module and be loaded into the application from the IFS manger.

Now if it is determined at 310 that the selected document is secured, the process 300 goes to 312 wherein the header or security information therein is decrypted with an authenticated user key associated with the user attempting to access the selected document (it is assumed that the user has already been authenticated). At 314, the access rules in the decrypted security information are retrieved. At 316, an access measurement or evaluation is triggered to determine if the user has the access right to access the selected document given the access rules from the document. If the evaluation fails, which means that the user is not permitted to access this particular document, a notification or alert message may be generated by the client module to be displayed to the user at 317. Alternatively, the application itself can display an alerting message when it fails to open the selected document. If the evaluation passes successfully, which means that the user is permitted to access this particular document, a file key is retrieved from the security information at 318 and used to decrypt the encrypted data portion in the selected (secured) document by a cipher module activated by the client module. As a result, at 320 the decrypted document or clear contents of the selected document is loaded into the application from the IFS manger.

FIG. 4 shows a flowchart of process 400 of carrying out the access evaluation according to one embodiment of the present invention. The process 400 of FIG. 4B may be employed as 316 in process 300 of FIG. 3. At 402, applicable system rules are obtained. In general, there may be one or more system rule sets employed to control access to secured documents in an inter/intra enterprise environment or a protected system. The process 400 can be configured to obtain one or all applicable system rule sets. At 404, the obtained system rule sets are examined to determine if there is a "Super" rule set. As used herein, a "Super" system rule set may be a set of rules imposed by, perhaps, a system operator or a user with authorized network privilege and can overwrite all other system rule sets. For example, an end user is, by a system rule set, not permitted to edit a secured file and can be granted a special permission by a Super rule set to edit the secured file. Accordingly, if there is a Super rule set, the Super rules are evaluated at 406, otherwise, the obtained system rule sets are respectively evaluated at 408.

Depending on implementation, rules may be evaluated logically or mathematically. If a parameter describing a condition to be checked matches or falls in a range defined by an attribute in a rule, a logical pass is produced. For example, an attribute in a rule specifies that only users (or members) in an engineering group or a membership can access secured files in folder Engineering. When the attribute in the rule is evaluated, a parameter (e.g. a user ID) identifying a user attempting to access one of the secured files is retrieved and compared to the attribute. If the parameter matches what the attribute defines, a logic pass or success is produced, otherwise a logic failure is produced. At 410, each of the items in one or more system rules is respectively evaluated. If there is a logic failure, the process 400 goes to 420, no access right to a secured file is granted. On the other hand, if each of the items in one or more system rules is respectively evaluated and all produce a logic pass, the process 400 goes to 412 to continue an evaluation against an access rule set in a secured file being accessed.

It is assumed that a user attempting to access the secured file has been already authenticated. At 412, the access rules are retrieved from the secured file. The access rules are evaluated at 414, similar to 406. If there is a logic fail, the process 400 goes to 420, no access to the secured file is permitted. On the other hand, if each of the items in the access rules is respectively evaluated and all produce a logic pass, an access grant 418 is provided. As a result, the user is permitted to access the secured file. To follow the exemplary secured file format in FIG. 1B, the user is now able to retrieve the file key to decrypt the encrypted data portion 124.

Given the description herein, those skilled in the art can appreciate that there is no specific order of which rule set shall be evaluated first and the process 400 can be deployed in a client machine and/or a server machine (e.g. a local or central server responsible for overall access control management). The process 400 may be implemented as a system, a process, a method and a software product. In particular, it can be applied in conjunction with applications in which one or more levels of rules (e.g. access rules) are applied. The advantages and benefits of the present invention are numerous. One of them is that items in all rules are respectively evaluated and all rule sets, if there are any, are jointly or serially evaluated before an access right is granted. Another one of the advantages and benefits is that the rule evaluation process can be configured to operate only when a secured file is accessed and the operations thereof is transparently to a user. Other advantages and benefits may be appreciated from the foregoing description.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

We claim:

1. A method for evaluating an access right of a user to an encrypted data portion of a secured electronic file, the method comprising:
obtaining a system rule set stored separate from the secured electronic file and an access rule set specific to the secured electronic file, wherein the system and access rule sets comprise a plurality of access rules applicable to the user that control access to the secured electronic file in an enterprise environment and that regulate at least a duration of access to the secured electronic file, wherein each access rule includes:
a rule type defining whether the rule is an authorization rule or a restriction rule;
a right attribute indicating a set of rights controlled by the access rule;
a resource attribute indicating a system or set of electronic files on which the access rule operates; and
a principal attribute indicating a user or group of users to which the access rule applies,
wherein each access rule is obtained based on matching at least one of the right attribute to the access right of the user, the resource attribute to the secured electronic file, and the principal attribute to the user;
evaluating the plurality of access rules of the system rule set to determine whether the user is allowed to access a protected system containing the secured electronic file, wherein the evaluation of the plurality of access rules of the system rule set is halted upon determining that the user does not meet evaluation criteria defined by a restriction rule of the plurality of access rules of the system rule set;
evaluating the plurality of access rules of the access rule set, in response to determining that the user is allowed to access the protected system, to determine whether the user has a type of access required to access the secured electronic file for the duration, wherein the evaluation of the plurality of access rules of the access rule set is halted upon determining that the user does not meet evaluation criteria defined by a restriction rule of the plurality of access rules of the access rule set;
decrypting the encrypted data portion of the secured electronic file in response to determining that the user has permission to access the secured electronic file; and
providing the decrypted data portion to the user.

2. The method of claim 1, wherein the system rule set is obtained from a server.

3. The method of claim 1, wherein obtaining the access rule set comprises:
activating a user key associated with a user attempting to access the secured electronic file after the user has been authenticated; and
decrypting the access rule set with the user key.

4. The method of claim 1, wherein the plurality of access rules are expressed in a markup language.

5. The method of claim 4, wherein the markup language is selected from a group consisting of XACML, HTML, XML, SGML.

6. The method of claim 1, wherein an access rule of the access rule set defines how the secured electronic file is permitted to be accessed.

7. The method of claim 1, wherein an access rule of the access rule set defines when the secured electronic file is permitted to be accessed.

8. The method of claim 1, wherein an access rule of the access rule set defines an application or type of application the secured electronic file is permitted to be accessed with.

9. The method of claim 1, wherein an access rule of the system rule set defines a group the secured electronic file is permitted to be accessed by.

10. The method of claim 1, wherein the plurality of access rules are evaluated using parameters.

11. The method of claim 10, wherein the parameters include a user identifier, an application identifier, a group identifier, and a current time.

12. The method of claim 1, further comprising:
obtaining a super system rule set that is distinct from the system rule set in response to determining that the user is not allowed to access the protected system containing the secured electronic file, wherein the super system rule set comprises access rules that override the access rules of the system rule set; and
evaluating the super system rule set to determine whether the user is allowed to access the protected system containing the secured electronic file.

13. The method of claim 1, wherein the access rule set is obtained from a header portion of the secured electronic file.

14. The method of claim 1, wherein each access rule further includes:

a condition expression defining evaluation criteria for the access rule.

15. The method of claim 1, wherein evaluating each access rule further comprises:
   determining whether each access rule is an authorization rule or a restriction rule;
   evaluating each access rule to determine whether the user meets evaluation criteria defined by the rule; and
   determining that the user has permission to access the secured electronic file when the user meets the evaluation criteria defined by each restriction rule and at least one authorization rule.

16. An article of manufacture including a computer-readable medium having computer-executable instructions stored thereon that, in response to execution by a computing device, cause the computing device to perform operations to evaluate access rights of a user to an encrypted data portion of a secured electronic file, the operations comprising:
   obtaining a system rule set stored separate from the secured electronic file and an access rule set specific to the secured file, wherein the system and access rule sets comprise a plurality of access rules applicable to the user that control access to the secured electronic file in an enterprise environment and that regulate at least a duration of access to the secured electronic file, wherein each access rule includes:
      a rule type defining whether the rule is an authorization rule or a restriction rule;
      a right attribute indicating a set of rights controlled by the access rule;
      a resource attribute indicating a system or set of electronic files on which the access rule operates; and
      a principal attribute indicating a user or group of users to which the access rule applies,
      wherein each access rule is obtained based on matching at least one of the right attribute to the access right of the user, the resource attribute to the secured electronic file, and the principal attribute to the user;
   evaluating the plurality of access rules of the system rule set to determine whether the user is allowed to access a protected system containing the secured electronic file, wherein the evaluation of the plurality of access rules of the system rule set is halted upon determining that the user does not meet evaluation criteria defined by a restriction rule of the plurality of access rules of the system rule set;
   evaluating the plurality of access rules of the access rule set, in response to detei mining that the user is allowed to access the protected system, to determine whether the user has a type of access required to access the secured electronic file for the duration, wherein the evaluation of the plurality of access rules of the access rule set is halted upon determining that the user does not meet evaluation criteria defined by a restriction rule of the plurality of access rules of the access rule set;
   decrypting the encrypted data portion of the secured electronic file in response to determining that the user has permission to access the secured electronic file; and
   providing the decrypted data portion to the user.

17. The article of manufacture of claim 16, wherein the system rule set is obtained from a server.

18. The article of manufacture of claim 16, wherein obtaining the access rule set comprises:
   activating a user key associated with a user attempting to access the secured electronic file; and
   decrypting the access rule set with the user key.

19. The article of manufacture of claim 16, wherein the plurality of access rules are expressed in a markup language.

20. The article of manufacture of claim 19, wherein the markup language is selected from a group consisting of XACML, HTML, XML, SGML.

21. The article of manufacture of claim 16, wherein an access rule of the access rule set defines how the secured electronic file is permitted to be accessed.

22. The article of manufacture of claim 16, wherein an access rule of the access rule set defines when the secured electronic file is permitted to be accessed.

23. The article of manufacture of claim 16, wherein an access rule of the access rule set defines what application or type of application the secured electronic file is permitted to be accessed with.

24. The article of manufacture of claim 16, wherein an access rule of the system rule set defines a group the secured electronic file is permitted to be accessed by.

25. The article of manufacture of claim 16, wherein the plurality of access rules are evaluated using parameters.

26. The article of manufacture of claim 25, wherein the parameters include a user identifier, an application identifier, a group identifier, and a current time.

27. The article of manufacture of claim 16, the operations further comprising:
   obtaining a super system rule set that is distinct from the system rule set in response to determining that the user is not allowed to access the protected system containing the secured electronic file, wherein the super system rule set comprises access rules that override the access rules of the system rule set; and
   evaluating the super system rule set to determine whether the user is allowed to access the protected system containing the secured electronic file.

* * * * *